US009628861B2

(12) United States Patent
Mountain

(10) Patent No.: US 9,628,861 B2
(45) Date of Patent: Apr. 18, 2017

(54) SOURCE-LINKED ELECTRONIC PROGRAMMING GUIDE

(71) Applicant: ECHOSTAR UK HOLDINGS LIMITED, Keighley, West Yorkshire (GB)

(72) Inventor: Dale Llewelyn Mountain, Keighley (GB)

(73) Assignee: EchoStar UK Holdings Limited, Steeton (GB)

( * ) Notice: Subject to any disclaimer, the term of this patent is extended or adjusted under 35 U.S.C. 154(b) by 0 days.

(21) Appl. No.: 14/470,415

(22) Filed: Aug. 27, 2014

(65) Prior Publication Data
US 2016/0066049 A1  Mar. 3, 2016

(51) Int. Cl.
G06F 3/00 (2006.01)
G06F 13/00 (2006.01)
H04N 5/445 (2011.01)
H04N 21/472 (2011.01)
H04N 21/462 (2011.01)
H04N 21/433 (2011.01)
H04N 21/61 (2011.01)
H04N 21/4335 (2011.01)

(52) U.S. Cl.
CPC ... *H04N 21/47214* (2013.01); *H04N 21/4334* (2013.01); *H04N 21/4622* (2013.01); *H04N 21/4335* (2013.01); *H04N 21/6193* (2013.01)

(58) Field of Classification Search
CPC combination set(s) only.
See application file for complete search history.

(56) References Cited

U.S. PATENT DOCUMENTS

| 6,005,562 A | 12/1999 | Shiga et al. |
| 6,177,931 B1 | 1/2001 | Alexander et al. |
| 6,681,396 B1 | 1/2004 | Bates et al. |
| 7,174,512 B2 | 2/2007 | Martin et al. |
| 7,197,715 B1 | 3/2007 | Valeria |
| 7,633,887 B2 | 12/2009 | Panwar et al. |
| 7,680,894 B2 | 3/2010 | Diot et al. |
| 7,774,811 B2 | 8/2010 | Poslinski et al. |
| 7,818,368 B2 | 10/2010 | Yang et al. |
| 7,825,989 B1 | 11/2010 | Greenberg |
| 7,849,487 B1 | 12/2010 | Vosseller |

(Continued)

FOREIGN PATENT DOCUMENTS

| EP | 1 865 716 A2 | 12/2007 |
| EP | 2 309 733 B1 | 4/2011 |

(Continued)

OTHER PUBLICATIONS

U.S. Appl. No. 14/470,248, filed Aug. 27, 2014, Preinterview first office action mailed Sep. 4, 2015, 22 pages.

(Continued)

*Primary Examiner* — Brian T Pendleton
*Assistant Examiner* — Alexander Gee
(74) *Attorney, Agent, or Firm* — Kilpatrick Townsend & Stockton LLP

(57) ABSTRACT

Surfacing or providing to an end-user via an electronic programming guide one or more alternative or alternate options for accessing particular content of interest, that which is initially itemized or presented for selection in or within the electronic programming guide.

19 Claims, 8 Drawing Sheets

(56) References Cited

U.S. PATENT DOCUMENTS

| | | |
|---|---|---|
| 8,046,798 B1 | 10/2011 | Schlack et al. |
| 8,079,052 B2 | 12/2011 | Chen et al. |
| 8,104,065 B2 | 1/2012 | Aaby et al. |
| 8,209,713 B1 | 6/2012 | Lai et al. |
| 8,296,797 B2 | 10/2012 | Olstad et al. |
| 8,312,486 B1* | 11/2012 | Briggs ............... H04N 21/435 725/32 |
| 8,424,041 B2* | 4/2013 | Candelore ............ H04N 5/913 725/132 |
| 8,627,349 B2 | 1/2014 | Kirby et al. |
| 8,689,258 B2 | 4/2014 | Kemp |
| 8,752,084 B1 | 6/2014 | Lai et al. |
| 8,973,038 B2 | 3/2015 | Gratton |
| 8,973,068 B2 | 3/2015 | Kotecha et al. |
| 8,990,418 B1 | 3/2015 | Bragg et al. |
| 9,038,127 B2 | 5/2015 | Hastings et al. |
| 9,066,156 B2 | 6/2015 | Kapa |
| 9,213,986 B1 | 12/2015 | Buchheit et al. |
| 9,253,533 B1 | 2/2016 | Morgan et al. |
| 9,264,779 B2 | 2/2016 | Kirby et al. |
| 9,420,333 B2 | 8/2016 | Martch et al. |
| 2001/0013123 A1 | 8/2001 | Freeman et al. |
| 2001/0026609 A1 | 10/2001 | Weinstein et al. |
| 2002/0059610 A1 | 5/2002 | Ellis |
| 2002/0067376 A1 | 6/2002 | Martin et al. |
| 2002/0075402 A1 | 6/2002 | Robson et al. |
| 2002/0174430 A1 | 11/2002 | Ellis et al. |
| 2002/0178444 A1 | 11/2002 | Trajkovic et al. |
| 2003/0023742 A1 | 1/2003 | Allen et al. |
| 2003/0056220 A1 | 3/2003 | Thornton et al. |
| 2003/0066077 A1 | 4/2003 | Gutta et al. |
| 2003/0118014 A1 | 6/2003 | Iyer et al. |
| 2003/0126605 A1 | 7/2003 | Betz et al. |
| 2003/0126606 A1 | 7/2003 | Buczak et al. |
| 2003/0154475 A1 | 8/2003 | Rodriguez et al. |
| 2003/0172376 A1 | 9/2003 | Coffin, III |
| 2003/0188317 A1 | 10/2003 | Liew et al. |
| 2003/0189674 A1 | 10/2003 | Inoue et al. |
| 2003/0208763 A1 | 11/2003 | McElhatten et al. |
| 2003/0229899 A1 | 12/2003 | Thompson et al. |
| 2004/0181807 A1 | 9/2004 | Theiste et al. |
| 2005/0030977 A1 | 2/2005 | Casey et al. |
| 2005/0044570 A1 | 2/2005 | Poslinski |
| 2005/0071865 A1 | 3/2005 | Martins |
| 2005/0091690 A1 | 4/2005 | Delpuch et al. |
| 2005/0125302 A1 | 6/2005 | Brown et al. |
| 2005/0152565 A1 | 7/2005 | Jouppi et al. |
| 2005/0166230 A1 | 7/2005 | Gaydou et al. |
| 2005/0180568 A1 | 8/2005 | Krause |
| 2005/0191041 A1 | 9/2005 | Braun et al. |
| 2005/0240961 A1 | 10/2005 | Jerding et al. |
| 2005/0264705 A1 | 12/2005 | Kitamura |
| 2006/0020962 A1 | 1/2006 | Stark et al. |
| 2006/0085828 A1 | 4/2006 | Dureau et al. |
| 2006/0174277 A1 | 8/2006 | Sezan et al. |
| 2006/0190615 A1 | 8/2006 | Panwar et al. |
| 2006/0238656 A1 | 10/2006 | Chen et al. |
| 2006/0253581 A1 | 11/2006 | Dixon et al. |
| 2006/0282852 A1 | 12/2006 | Purpura et al. |
| 2006/0282869 A1 | 12/2006 | Plourde, Jr. |
| 2007/0033616 A1 | 2/2007 | Gutta |
| 2007/0058930 A1 | 3/2007 | Iwamoto |
| 2007/0083901 A1 | 4/2007 | Bond |
| 2007/0127894 A1 | 6/2007 | Ando et al. |
| 2007/0146554 A1 | 6/2007 | Strickland et al. |
| 2007/0154163 A1 | 7/2007 | Cordray |
| 2007/0154169 A1 | 7/2007 | Cordray et al. |
| 2007/0157235 A1 | 7/2007 | Teunissen |
| 2007/0157249 A1 | 7/2007 | Cordray et al. |
| 2007/0157253 A1 | 7/2007 | Ellis et al. |
| 2007/0169165 A1 | 7/2007 | Crull et al. |
| 2007/0188655 A1 | 8/2007 | Ohta |
| 2007/0199040 A1 | 8/2007 | Kates |
| 2007/0204302 A1 | 8/2007 | Calzone |
| 2007/0226766 A1 | 9/2007 | Poslinski et al. |
| 2007/0245379 A1 | 10/2007 | Agnihortri |
| 2007/0288951 A1 | 12/2007 | Ray et al. |
| 2008/0022012 A1 | 1/2008 | Wang |
| 2008/0060006 A1 | 3/2008 | Shanks et al. |
| 2008/0086743 A1 | 4/2008 | Cheng et al. |
| 2008/0097949 A1 | 4/2008 | Kelly et al. |
| 2008/0109307 A1 | 5/2008 | Ullah |
| 2008/0134043 A1 | 6/2008 | Georgis et al. |
| 2008/0163305 A1 | 7/2008 | Johnson et al. |
| 2008/0195457 A1 | 8/2008 | Sherman et al. |
| 2008/0235348 A1 | 9/2008 | Dasgupta |
| 2008/0239169 A1 | 10/2008 | Moon et al. |
| 2008/0244666 A1 | 10/2008 | Moon et al. |
| 2008/0270038 A1 | 10/2008 | Partovi et al. |
| 2008/0300982 A1 | 12/2008 | Larson et al. |
| 2008/0320523 A1 | 12/2008 | Morris et al. |
| 2009/0044217 A1 | 2/2009 | Lutterbach et al. |
| 2009/0055385 A1 | 2/2009 | Jeon et al. |
| 2009/0102984 A1 | 4/2009 | Arling et al. |
| 2009/0138902 A1 | 5/2009 | Kamen |
| 2009/0178071 A1 | 7/2009 | Whitehead |
| 2009/0210898 A1 | 8/2009 | Childress et al. |
| 2009/0228911 A1 | 9/2009 | Vrijsen |
| 2009/0234828 A1 | 9/2009 | Tu |
| 2009/0249412 A1* | 10/2009 | Bhogal ............... H04N 7/17318 725/104 |
| 2009/0293093 A1 | 11/2009 | Igarashi |
| 2009/0299824 A1 | 12/2009 | Barnes, Jr. |
| 2009/0325523 A1 | 12/2009 | Choi |
| 2010/0040151 A1 | 2/2010 | Garrett |
| 2010/0064306 A1 | 3/2010 | Tiongson et al. |
| 2010/0071007 A1 | 3/2010 | Meijer |
| 2010/0071062 A1 | 3/2010 | Choyi et al. |
| 2010/0089996 A1 | 4/2010 | Koplar |
| 2010/0115554 A1 | 5/2010 | Drouet et al. |
| 2010/0122294 A1 | 5/2010 | Craner |
| 2010/0125864 A1 | 5/2010 | Dwyer et al. |
| 2010/0146560 A1 | 6/2010 | Bonfrer |
| 2010/0153983 A1 | 6/2010 | Philmon et al. |
| 2010/0153999 A1 | 6/2010 | Yates |
| 2010/0158479 A1 | 6/2010 | Craner |
| 2010/0166389 A1 | 7/2010 | Knee et al. |
| 2010/0169925 A1 | 7/2010 | Takegoshi |
| 2010/0218214 A1 | 8/2010 | Fan et al. |
| 2010/0251295 A1 | 9/2010 | Amento et al. |
| 2010/0262986 A1 | 10/2010 | Adimatyam et al. |
| 2010/0269144 A1 | 10/2010 | Forsman et al. |
| 2010/0319019 A1 | 12/2010 | Zazza |
| 2010/0322592 A1 | 12/2010 | Casagrande |
| 2010/0333131 A1 | 12/2010 | Parker et al. |
| 2011/0016492 A1 | 1/2011 | Morita |
| 2011/0019839 A1 | 1/2011 | Nandury |
| 2011/0052156 A1* | 3/2011 | Kuhn .................. G11B 27/34 386/295 |
| 2011/0072448 A1 | 3/2011 | Stiers et al. |
| 2011/0082858 A1 | 4/2011 | Yu et al. |
| 2011/0109801 A1 | 5/2011 | Thomas et al. |
| 2011/0173337 A1 | 7/2011 | Walsh et al. |
| 2011/0202956 A1 | 8/2011 | Connelly et al. |
| 2011/0206342 A1* | 8/2011 | Thompson ............ H04N 5/782 386/200 |
| 2011/0239249 A1 | 9/2011 | Murison et al. |
| 2011/0243533 A1 | 10/2011 | Stern et al. |
| 2011/0252451 A1 | 10/2011 | Turgeman et al. |
| 2011/0286721 A1 | 11/2011 | Craner |
| 2011/0289410 A1 | 11/2011 | Paczkowski et al. |
| 2011/0293113 A1 | 12/2011 | McCarthy |
| 2012/0020641 A1 | 1/2012 | Sakaniwa et al. |
| 2012/0052941 A1 | 3/2012 | Mo |
| 2012/0060178 A1 | 3/2012 | Minakuchi et al. |
| 2012/0106932 A1 | 5/2012 | Grevers, Jr. |
| 2012/0110615 A1 | 5/2012 | Kilar et al. |
| 2012/0110616 A1 | 5/2012 | Kilar et al. |
| 2012/0124625 A1 | 5/2012 | Foote et al. |
| 2012/0131613 A1 | 5/2012 | Ellis et al. |
| 2012/0185895 A1 | 7/2012 | Wong et al. |
| 2012/0204209 A1 | 8/2012 | Kubo |
| 2012/0230651 A1 | 9/2012 | Chen |
| 2012/0246672 A1 | 9/2012 | Sridhar et al. |

(56) References Cited

U.S. PATENT DOCUMENTS

| | | |
|---|---|---|
| 2012/0260295 A1 | 10/2012 | Rondeau |
| 2012/0278834 A1 | 11/2012 | Richardson |
| 2012/0278837 A1 | 11/2012 | Curtis et al. |
| 2012/0284745 A1 | 11/2012 | Strong |
| 2012/0311633 A1 | 12/2012 | Mandrekar et al. |
| 2013/0014159 A1 | 1/2013 | Wiser et al. |
| 2013/0055304 A1 | 2/2013 | Kirby et al. |
| 2013/0061313 A1 | 3/2013 | Cullimore et al. |
| 2013/0074109 A1 | 3/2013 | Skelton et al. |
| 2013/0114940 A1* | 5/2013 | Merzon .............. H04N 5/76 386/241 |
| 2013/0128119 A1 | 5/2013 | Madathodiyil et al. |
| 2013/0145023 A1 | 6/2013 | Li et al. |
| 2013/0174196 A1 | 7/2013 | Herlein |
| 2013/0194503 A1 | 8/2013 | Yamashita |
| 2013/0263189 A1 | 10/2013 | Garner |
| 2013/0283162 A1 | 10/2013 | Aronsson et al. |
| 2013/0291037 A1 | 10/2013 | Im et al. |
| 2013/0298151 A1 | 11/2013 | Leske et al. |
| 2013/0332962 A1 | 12/2013 | Moritz et al. |
| 2013/0346302 A1 | 12/2013 | Purves et al. |
| 2014/0032709 A1* | 1/2014 | Saussy .............. G06Q 30/0267 709/217 |
| 2014/0068675 A1 | 3/2014 | Mountain |
| 2014/0068692 A1 | 3/2014 | Archibong et al. |
| 2014/0114966 A1 | 4/2014 | Bilinski et al. |
| 2014/0123160 A1 | 5/2014 | van Coppenolle et al. |
| 2014/0130097 A1* | 5/2014 | Londero .......... H04N 5/44543 725/48 |
| 2014/0130099 A1* | 5/2014 | Kunisetty .......... H04N 21/4667 725/50 |
| 2014/0139555 A1 | 5/2014 | Levy |
| 2014/0140680 A1* | 5/2014 | Jo .................. H04N 9/8715 386/241 |
| 2014/0150009 A1 | 5/2014 | Sharma |
| 2014/0153904 A1 | 6/2014 | Adimatyam et al. |
| 2014/0157327 A1* | 6/2014 | Roberts .............. H04L 67/10 725/61 |
| 2014/0215539 A1 | 7/2014 | Chen et al. |
| 2014/0282714 A1 | 9/2014 | Hussain |
| 2014/0282741 A1 | 9/2014 | Shoykhet |
| 2014/0282744 A1 | 9/2014 | Hardy et al. |
| 2014/0282745 A1 | 9/2014 | Chipman et al. |
| 2014/0282759 A1 | 9/2014 | Harvey et al. |
| 2014/0282779 A1 | 9/2014 | Navarro |
| 2014/0294201 A1 | 10/2014 | Johnson et al. |
| 2014/0310819 A1* | 10/2014 | Cakarel .............. H04N 21/2225 726/26 |
| 2014/0313341 A1* | 10/2014 | Stribling .............. H04L 67/02 348/157 |
| 2014/0325556 A1 | 10/2014 | Hoang et al. |
| 2014/0331260 A1 | 11/2014 | Gratton |
| 2014/0333841 A1 | 11/2014 | Steck |
| 2014/0351045 A1 | 11/2014 | Abihssira et al. |
| 2014/0373079 A1 | 12/2014 | Friedrich et al. |
| 2015/0003814 A1 | 1/2015 | Miller |
| 2015/0020097 A1 | 1/2015 | Freed et al. |
| 2015/0040176 A1 | 2/2015 | Hybertson et al. |
| 2015/0058890 A1 | 2/2015 | Kapa |
| 2015/0095932 A1 | 4/2015 | Ren |
| 2015/0118992 A1 | 4/2015 | Wyatt et al. |
| 2015/0181132 A1 | 6/2015 | Kummer et al. |
| 2015/0181279 A1 | 6/2015 | Martch et al. |
| 2015/0249803 A1 | 9/2015 | Tozer et al. |
| 2015/0249864 A1 | 9/2015 | Tang et al. |
| 2015/0310725 A1 | 10/2015 | Koskan et al. |
| 2016/0066020 A1 | 3/2016 | Mountain |
| 2016/0066026 A1 | 3/2016 | Mountain |
| 2016/0066049 A1 | 3/2016 | Mountain |
| 2016/0066056 A1 | 3/2016 | Mountain |
| 2016/0073172 A1 | 3/2016 | Sharples |
| 2016/0088351 A1 | 3/2016 | Petruzzelli et al. |
| 2016/0191147 A1 | 6/2016 | Martch |
| 2016/0198229 A1 | 7/2016 | Keipert |
| 2016/0309212 A1 | 10/2016 | Martch et al. |

FOREIGN PATENT DOCUMENTS

| | | |
|---|---|---|
| EP | 2 403 239 A1 | 1/2012 |
| FR | 2 902 568 A1 | 12/2007 |
| JP | H10 322622 A | 12/1998 |
| JP | 2006-245745 A | 9/2006 |
| KR | 2004 0025073 A | 3/2004 |
| KR | 2006 0128295 A | 12/2006 |
| WO | 98/37694 A1 | 8/1998 |
| WO | 2005/059807 A2 | 6/2005 |
| WO | 2007/064987 A2 | 6/2007 |
| WO | 2007/098067 A1 | 8/2007 |
| WO | 2009/073925 A1 | 6/2009 |
| WO | 2011/040999 A1 | 4/2011 |
| WO | 2013/016626 A1 | 1/2013 |
| WO | 2014/072742 A1 | 5/2014 |
| WO | 2014/164782 A1 | 10/2014 |
| WO | 2014/179017 A1 | 11/2014 |
| WO | 2016/030384 | 3/2016 |
| WO | 2016/030477 A1 | 3/2016 |
| WO | 2016/034899 A1 | 3/2016 |
| WO | 2016/055761 A1 | 4/2016 |

OTHER PUBLICATIONS

U.S. Appl. No. 14/470,279, filed Aug. 27, 2014, Preinterview first office action mailed Aug. 26, 2015, 23 pages.
U.S. Appl. No. 14/479,007, filed Sep. 5, 2014, Non-Final Office Action mailed Sep. 1, 2015, 44 pages.
U.S. Appl. No. 14/139,299, filed Dec. 23, 2013, Non Final Office Action mailed Aug. 14, 2015, 39 pages.
Jin S H et al., "Intelligent broadcasting system and services for personalized semantic contents consumption", Expert Systems With Applications, Oxford, GB, vol. 31, No. 1, Jul. 1, 2006, pp. 164-173, XP024962718, ISSN: 0957-4174, DOI: 10.1016/J.ESWA.2005.09.021.
Sung Ho Jin et al., "Real-time content filtering for live broadcasts in TV terminals", Multimedia Tools and Applications, Kluwer Academic Publishers, BO, vol. 36, No. 3, Jun. 29, 2007 pp. 285-301, XP019578768, ISSN: 1573-7721.
European Search Report for EP 14197940.1 mailed Apr. 28, 2015, 13 pages.
U.S. Appl. No. 14/139,420, filed Dec. 23, 2013 Non-Final Office Action mailed Apr. 30, 2015, 27 pages.
U.S. Appl. No. 14/095,860, filed Dec. 3, 2013 Final Office Action mailed May 1, 2015, 18 pages.
U.S. Appl. No. 14/071,613, filed Nov. 4, 2013 Non-Final Office Action mailed May 18, 2015, 20 pages.
U.S. Appl. No. 13/942,451, filed Jul. 15, 2013 Final Office Action mailed Apr. 30, 2015, 33 pages.
U.S. Appl. No. 13/971,579, filed Aug. 20, 2013 Notice of Allowance mailed Feb. 27, 2015, 28 pages.
U.S. Appl. No. 13/384,916, filed Mar. 15, 2013 Non-Final Office Action mailed Apr. 27, 2015, 22 pages.
U.S. Appl. No. 13/919,702, filed Jun. 17, 2013 Non-Final Office Action mailed Apr. 30, 2015, 26 pages.
Extended European Search Report for EP 14160140.1 received Jul. 7, 2014, 7 pages.
Extended European Search Report for EP 11166892.7 dated Oct. 6, 2011, 7 pages.
International Search Report and Written Opinion for PCT/US2014/023466 mailed Jul. 10, 2014, 15 pages.
International Search Report and Written Opinion of PCT/US2014/033796 mailed Sep. 5, 2014, 12 pages.
U.S. Appl. No. 13/834,916, filed Mar. 15, 2013 Non Final Office Action dated Aug. 8, 2014, 19 pages.
U.S. Appl. No. 13/919,702, filed Jun. 17, 2013 Non Final Office Action mailed Jun. 11, 2014, 25 pages.
U.S. Appl. No. 13/942,451, filed Jul. 15, 2013 Non Final Office Action mailed Jul. 28, 2014, 27 pages.

(56) References Cited

OTHER PUBLICATIONS

U.S. Appl. No. 13/971,579, filed Aug. 20, 2013 Non Final Office Action mailed Oct. 28, 2014, 35 pages.
U.S. Appl. No. 14/200,864, filed Mar. 7, 2014, Non-Final Office Action mailed Dec. 5, 2014, 35 pages.
U.S. Appl. No. 14/095,860, filed Dec. 3, 2013 Non-Final Office Action mailed Dec. 26, 2014, 45 pages.
U.S. Appl. No. 13/919,702, filed Jun. 17, 2013 Final Office Action mailed Nov. 18, 2014, 24 pages.
U.S. Appl. No. 13/886,873, filed May 3, 2013, Notice of Allowance mailed Oct. 24, 2014, 40 pages.
U.S. Appl. No. 13/834,916 filed Mar. 15, 2013 Final Office Action mailed Jan. 12, 2015, 22 pages.
U.S. Appl. No. 13/801,932, filed Mar. 13, 2013 Non Final Office Action mailed Jun. 24, 2015, 21 pages.
U.S. Appl. No. 14/095,860, filed Dec. 3, 2013 Notice of Allowance mailed Jul. 13, 2015, 31 pages.
U.S. Appl. No. 14/200,864, filed Mar. 7, 2014 Final Office Action mailed Jun. 18, 2015, 36 pages.
Office Action for EP 14160140.1 mailed Jan. 19, 2016, 5 pages.
International Search Report and Written Opinion for PCT/GB2015/052570 mailed Dec. 11, 2015, 13 pages.
U.S. Appl. No. 13/801,932, filed Mar. 13, 2013 Final Office Action mailed Dec. 17, 2015, 23 pages.
U.S. Appl. No. 14/470,248, filed Aug. 27, 2014, Final Office Action mailed Feb. 16, 2016, 26 pages.
U.S. Appl. No. 14/470,279, filed Aug. 27, 2014, Final Office Action mailed Jan. 22, 2016, 25 pages.
U.S. Appl. No. 14/591,474, filed Jan. 7, 2015, Non-Final Office Action mailed Feb. 12, 2016, 32 pages.
U.S. Appl. No. 14/494,079, filed Sep. 23, 2014, Preinterview first office action mailed Feb. 10, 2016, 6 pages.
International Preliminary Report on Patentability for PCT/US2014/023466 issued Sep. 15, 2015, 9 pages.
International Search Report and Written Opinion for PCT/EP2015/069461 mailed Oct. 1, 2015, 13 pages.
International Search Report and Written Opinion for PCT/EP2015/069456 mailed Oct. 5, 2015, all pages.
International Preliminary Report on Patentability for PCT/US2014/033796 issued Nov. 3, 2015, all pages.
International Search Report and Written Opinion for PCT/EP2015/069681 mailed Nov. 23, 2015, 12 pages.
U.S. Appl. No. 13/834,916, filed Mar. 15, 2013 Final Office Action mailed Dec. 14, 2015, 31 pages.
U.S. Appl. No. 14/297,322, filed Jun. 5, 2014 Notice of Allowance mailed Nov. 5, 2015, 34 pages.
U.S. Appl. No. 14/297,279, filed Jun. 5, 2014 Non-Final Office Action mailed Nov. 5, 2015, 45 pages.
U.S. Appl. No. 14/095,860, filed Dec. 3, 2013 Notice of Allowance mailed Oct. 19, 2015, 14 pages.
U.S. Appl. No. 13/919,702, filed Jun. 17, 2013 Final Office Action mailed Dec. 31, 2015, 30 pages.
U.S. Appl. No. 14/071,613, filed Nov. 4, 2013 Final Office Action mailed Oct. 8, 2015, 11 pages.
U.S. Appl. No. 14/470,392, filed Aug. 27, 2014 Non Final Office Action mailed Nov. 5, 2015, 31 pages.
U.S. Appl. No. 13/942,451, filed Jul. 15, 2013 Non Final Office Action mailed Jan. 8, 2016, 41 pages.
U.S. Appl. No. 13/801,932, filed Mar. 13, 2013 Non-Final Rejection mailed May 20, 2016, 28 pages.
U.S. Appl. No. 14/297,279, filed Jun. 5, 2014 Final Rejection mailed Apr. 22, 2016, 33 pages.
U.S. Appl. No. 14/200,864, filed Mar. 7, 2014 Non-Final Office Action mailed Feb. 18, 2016, 61 pages.
U.S. Appl. No. 14/479,007, filed Sep. 5, 2014, Final Office Action mailed Feb. 22, 2016, 37 pages.
U.S. Appl. No. 14/139,299, filed Dec. 23, 2013, Final Office Action mailed Feb. 25, 2016, all pages.
U.S. Appl. No. 14/139,420, filed Dec. 23, 2013 Notice of Allowance mailed Mar. 31, 2016, 37 pages.
U.S. Appl. No. 14/470,392, filed Aug. 27, 2014 Final Office Action mailed Mar. 4, 2016, all pages.
U.S. Appl. No. 15/195,527, filed Jun. 28, 2016, Non-Final Rejection mailed Sep. 30, 2016, all pages.
U.S. Appl. No. 13/942,451, filed Jul. 15, 2013 Non Final Office Action mailed Oct. 25, 2016, all pages.
U.S. Appl. No. 13/919,702, filed Jun. 17, 2013 Final Office Action mailed Oct. 28, 2016, all pages.
International Search Report and Written Opinion for PCT/GB2015/052456 mailed Jun. 13, 2016, all pages.
U.S. Appl. No. 13/834,916, filed Mar. 15, 2013 Non-Final Rejection mailed Aug. 18, 2016, all pages.
U.S. Appl. No. 14/470,248, filed Aug. 27, 2014, Non Final Office Action mailed Jul. 25, 2016, all pages.
U.S. Appl. No. 14/470,279, filed Aug. 27, 2014, Non Final Office Action mailed Jul. 19, 2016, all pages.
U.S. Appl. No. 14/479,007, filed Sep. 5, 2014, Non-Final Office Action mailed Jul. 27, 2016, 37 pages.
U.S. Appl. No. 13/942,451, filed Jul. 15, 2013 Final Office Action mailed Jun. 22, 2016, all pages.
U.S. Appl. No. 13/919,702, filed Jun. 17, 2013 Non Final Office Action mailed Jun. 30, 2016, all pages.
U.S. Appl. No. 14/139,299, filed Dec. 23, 2013, Non Final Office Action mailed Jun. 20, 2016, all pages.
U.S. Appl. No. 14/470,392, filed Aug. 27, 2014 Non-Final Office Action mailed Aug. 5, 2016, all pages.
U.S. Appl. No. 14/200,864, filed Mar. 7, 2014 Notice of Allowance mailed Sep. 15, 2016, all pages.

* cited by examiner

SOURCE-LINKED ELECTRONIC PROGRAMMING GUIDE

BACKGROUND

The advent of the digital video recorder and the availability of high-capacity and affordable computer-readable storage devices have made available many possibilities to television service providers and viewers alike. Further, viewers have come to expect convenience with respect to accessing of content via their television receivers.

SUMMARY

In an aspect, a method may include or comprise: detecting, by a television receiver, a command to define a timer to record particular programming at a time of broadcast of the particular programming by a satellite television provider; outputting, in response to the detecting, by the television receiver for display by a presentation device, an interactive interface that provides at least one option for access to the particular programming from a source other than the satellite television provider; and receiving, by the television receiver from a particular source other than the satellite television provider, the particular programming for display by the presentation device in response to detection of a selection of an indicator within the interactive interface associated with the particular source other than the satellite television provider.

In an aspect, a television receiver may include or comprise: at least one processor; and at least one memory element communicatively coupled with and readable by at least one processor and having stored therein processor-readable instructions. The processor-readable instructions may when executed by the at least one processor cause the at least one processor to: detect a command to define a timer to record particular programming at a time of broadcast of the particular programming by a satellite television provider; output to a presentation device an interactive interface that provides at least one option for access to the particular programming from a source other than the satellite television provider; and establish a communication link to receive from a particular source other than the satellite television provider the particular programming for transfer to the presentation device in response to detection of a selection of an indicator within the interactive interface associated with the particular source other than the satellite television provider.

In an aspect, a method may include or comprise outputting, by a television receiver to a presentation device in response to detection of a command to define a timer to record particular programming at a time of broadcast of the particular programming by a satellite television provider, an interactive interface that provides at least one option for access to the particular programming from a source other than the satellite television provider; detecting, by the television receiver, selection of an indicator within the interactive interface associated with the particular source other than the satellite television provider; and receiving, by the television receiver from a particular source other than the satellite television provider, the particular programming for display by the presentation device in response to the selection of the indicator within the interactive interface associated with the particular source other than the satellite television provider.

Other aspects are possible.

DETAILED DESCRIPTION

Figure 1:
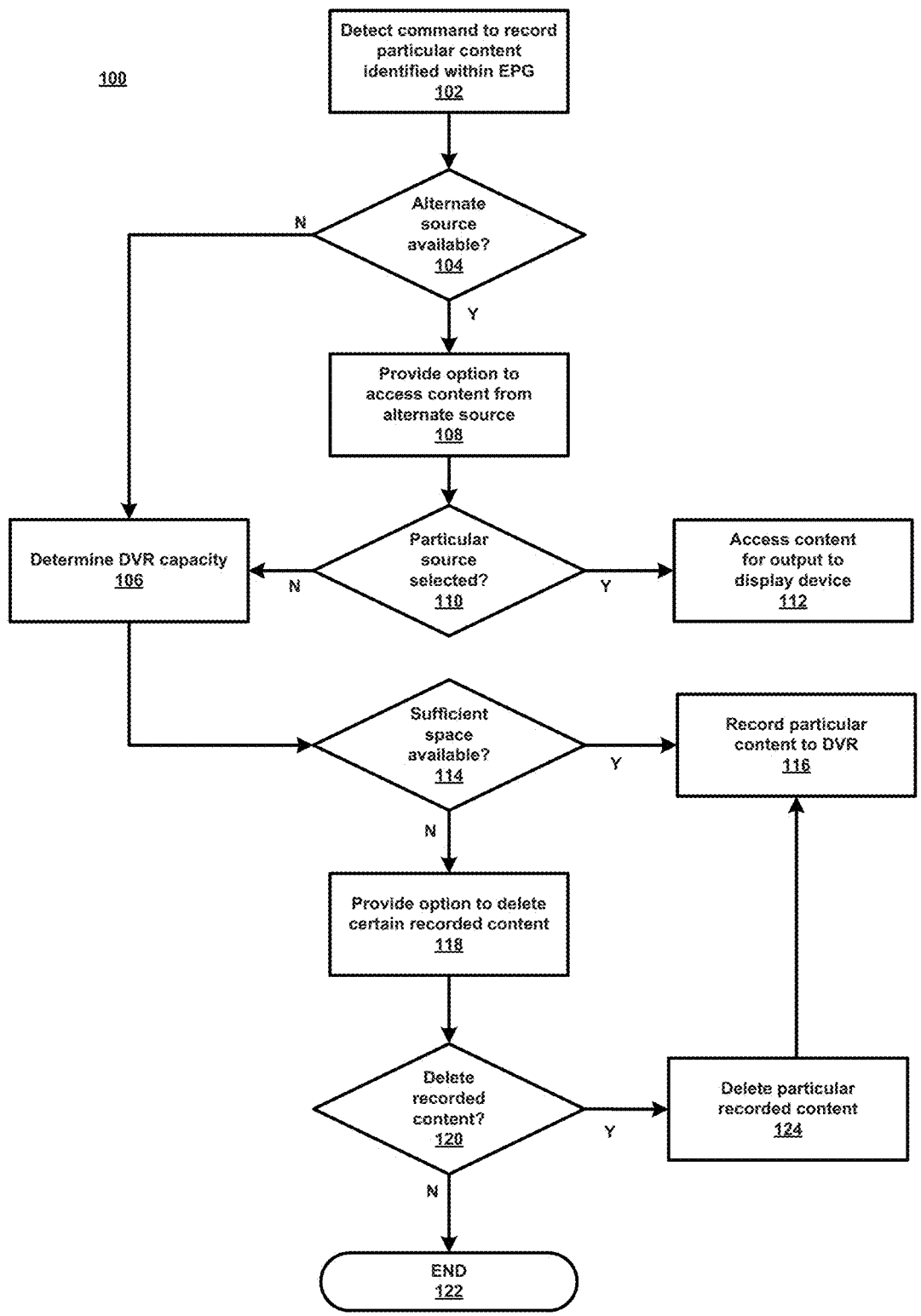
FIG. 1 shows a first example method according to the disclosure.

The present disclosure is directed to or towards systems and methods for surfacing or providing to a television viewer via an EPG (Electronic Programming Guide) one or more alternative or alternate options for accessing particular content of interest, that which is initially itemized or presented for selection in the EPG. For instance, a particular instance of programming may be initially highlighted or placed in-focus within the EPG by the television viewer, and then a record button, or the like, may be selected by the television viewer with the intention to record that particular instance of programming to a DVR (Digital Video Recorder), for later or subsequent viewing. In response to that selection, an interface may be presented that which provides an indication to the television viewer that the particular instance of programming is available for access via one or more third party providers, to which the television viewer is or has subscribed. Here, it is contemplated that the television viewer may optionally select a particular third party provider to access the particular instance of programming, so as to enable the television viewer to avoid the step of recording that particular instance of programming to the DVR, thus saving or conserving storage space of the DVR.

It is further contemplated that a decline button, or the like, may be optionally selected by the television viewer to enable the television viewer to decline or refuse access to the particular instance of programming as provided by any particular third party provider. In this example, it might be assumed that the television viewer has the intention to record that particular instance of programming to the DVR at an actual time of broadcast of the same, such as in a satellite television implementation, in response to the selection of the decline button, an interface may be presented to the television viewer that which provides an indication to the television viewer, when applicable, that the DVR does not currently, or at an instant point in time, have enough available, non-utilized storage space to permit or allow a recording of the particular instance of programming to be stored thereto. Here, an option may be presented to the television viewer to enable the viewer to delete one or more instances of content currently stored to the DVR, so as to at least create the necessary space to permit or allow a recording of the particular instance of programming to be stored thereon.

In still another example, a particular instance of programming may be initially highlighted or placed in-focus within the EPG by a television viewer, and then a record button, or the like, may be selected by the television viewer with the intention to record that particular instance of programming to the DVR for later or subsequent viewing. In response to that selection, an interface may be presented providing an indication to the television viewer that the particular instance of programming is available for access via one or more third party providers, to which the television viewer is not or has not subscribed. Here, it is contemplated that the television viewer may interact with the interface to explore terms and/or services and/or programming options provided by each of the one or more third party providers to which the television viewer is not currently subscribed. Upon identifying an option of-interest, the television viewer may then select that particular option to gain access to that particular instance of programming, and possibly other programming, as per the terms, services, etc., as offered by an associated third party provider. Although, this may not necessarily occur as there is no requirement that the particular instance of programming actually be accessed via the aforementioned third party provider. In this manner, it is further contemplated that the television viewer may optionally decline or refuse access to the particular instance of programming as provided by any particular third party provider. It might be assumed in such a scenario that the television viewer has the intention to record that particular instance of programming to the DVR at an actual time of broadcast of the same. Accordingly, a sequence of steps similar to that described above may enable the television viewer to delete one or more instances of programming currently stored to the DVR, so as to at least create the necessary space to permit or allow a recording of the particular instance of programming to be stored thereon.

In still another example, a particular instance of programming may be initially highlighted or placed in-focus within the EPG by a television viewer and, one or more selectable buttons or icons may be generated so as to appear within or near or adjacent a cell or control within the EPG associated with the particular instance of programming. In this example, each one of the one or more selectable buttons or icons may be distinguished from each other, for example by virtue of being displayed as a particular logo or icon that is itself associated with a particular third party provider. Here, it is contemplated that the television viewer may select any particular button or icon, possibly with the intention to explore or investigate terms and/or services and/or programming options provided by each of one or more third party providers to which a subscription associated with the television viewer, or an account of the television viewer, may or may not exist. It is further contemplated that the television viewer may be exposed to a plurality of other content related to the particular instance of programming, that of which might be anticipated as probably or potentially interesting to the television viewer, by virtue of the television viewer taking the initial step of showing interest in the particular instance of programming within the EPG. Additionally, it is contemplated that the television viewer may accept or decline in a manner similar to the described above, and in further detail throughout.

The examples as briefly discussed above may each be beneficial and/or advantageous in many different respects. For example, those and other features or aspects of the present disclosure may, among other things, serve to entice new customers to subscribe to services as offered by a particular satellite television provider, as well as provide an incentive for existing customers to maintain their loyalty and/or relationship with the particular satellite television provider. Although not so limited, an appreciation of the various aspects of the present disclosure may be gained from the following discussion in connection with the drawings. For instance, referring now to FIG. 1, a first example method 100 is shown according to the disclosure.

At step 102, a particular television receiver may detect a command to record a particular instance of programming as identified or listed within a particular EPG interface as scheduled to be broadcast at a particular date/time. Here, the particular EPG interface may be configured and/or arranged in a manner consistent with the principles of the present disclosure. For example, a particular user may interact with a handheld device, such as a smartphone or remote control device for example, to traverse and access content listed within the EPG, via any particular menu-driven, possibly implementation-specific, navigation technique. The particular user may then highlight, or place in-focus, or the like, within the EPG interface the particular instance of programming, and then highlight, or place in-focus, or the like, a button or icon that when selected provides or otherwise transmits a command to the television receiver to record the particular instance of programming to a DVR associated with the television receiver. It is contemplated that then one or more actions may be implemented by the television receiver for the purpose of surfacing or providing to the television viewer via the EPG interface one or more alternative options for accessing particular content of interest, that which is initially itemized or presented for selection in the EPG interface.

For example, at step 104, the television receiver may then query one or more local resources (e.g., of or at least accessible by the television receiver itself), and possibly one or more non-local resources (e.g., physically remote resources or devices as accessible over one or more networks), to determine whether or not one or more alternative resources are currently or instantly available, that which may serve the particular instance of programming to the television receiver independent of an actual broadcast of the particular instance of programming at the above-mentioned date/time. When, for example, the television receiver determines that one or more alternate resources are not available, process flow within the method 100 may branch to step 106, discussed below. When, however, the television receiver determines that one or more alternative resources are available, process flow within the example method 100 may branch to step 108. At step 108, the television receiver may, in general, generate and provide one or more interfaces, one or more selectable icons or buttons, or the like, accessible and ultimately selectable to or by the particular user via the above-mentioned menu-driven aspects of the EPG interface, to enable the particular user to optionally select a particular alternate resource to access the particular instance of programming. Process flow within the method 100 may then proceed to step 110.

At step 110, the television receiver may detect (or not) selection of a particular one of the above-mentioned interfaces, selectable icons or buttons, etc. Here, it may be assumed that a detected selection of a particular one of the above-mentioned interfaces or icons or buttons corresponds to or is associated with a selection to access the particular instance of programming via or by a particular alternate resource. Thus, in this scenario, the particular user may be considered to have elected to forego recording of the particular instance of programming, instead electing to access the same via a particular alternate source. Accordingly, when, for example, the television receiver determines that a selection of a particular one of the above-mentioned one or more interfaces, one or more selectable icons or buttons, or the like, has been made, process flow within the example method 100 may branch to step 112. At step 112, the television receiver may output for display by a presentation device, such as a smartphone or television, the particular instance of programming for instant viewing.

When, however, the television receiver determines that a selection of a particular one of the above-mentioned one or more interfaces, one or more selectable icons or buttons, or the like, has not been made, process flow within the method 100 may branch to step 106. Accordingly, step 106 may be accessed within the method 100 from a branch from step 104, as discussed above, or from a branch from step 110. At step 106, the television receiver may determine actual and/or available capacity of the above-mentioned DVR that is associated with the television receiver. For example, the particular television receiver may determine that only "1%" of the total storage capacity of the DVR is unused. In other words, in this example, it may be assumed that "99%" of the total storage capacity of the DVR is currently being used by virtue of having particular content stored thereon that occupies nearly the entire memory of the DVR. Next, process flow within the method 100 may proceed to step 114.

At step 114, the television receiver may determine whether or not there is enough storage space to record and/or store the particular instance of programming to the DVR, at the actual time of broadcast of the same. Indeed, step 114 of the method 100 is accessed when it is found by the television receiver that either an alternative source is currently or instantly unavailable (step 104) or, even when an alternative source is currently available, no particular alternate source of the particular instance of programming has been found to be selected to provide access to the same (step 110). Accordingly, when, for example, the television receiver determines that there is enough storage space to record and/or store the particular instance of programming to the DVR, process flow within the method 100 may branch to step 116. At step 116, the television receiver itself may receive and transfer, for persistent storage thereon the particular instance of programming to the DVR, at the actual time of broadcast of the same. In some examples, this may be instantiated and perfected via the "firing" of a recording timer as detected by the television receiver so that the particular instance of programming may be stored to the DVR.

When, however, the television receiver determines that there is not enough storage space to record and/or store the particular instance of programming to the DVR, process flow within the method 100 may branch to step 118. At step 118, the television receiver may, in general, generate and provide one or more interfaces, one or more selectable icons or buttons, or the like, accessible and ultimately selectable to or by the particular user to enable the particular user to delete one or more instances of content currently stored to DVR. Here, it is contemplated that the interfaces, for example, may itemize each instance of content currently stored to DVR along with a "size" of that content, and possibly additional information such as "how much" of the storage space of the DVR is occupied by a particular instance of content.

Additionally, similar information may be presented by the interface(s) in relation to the particular instance of programming. For example, the interface may indicate, among other information, that "99%" of the storage capacity of the DVR is currently unavailable by virtue of particular content stored thereto, that "Movie A" as stored thereto accounts for "1 GB" of storage space of the DVR, and that it is estimated that the particular instance of programming too would occupy "1 GB" of storage space of the DVR if stored thereto. It will be appreciated that these numbers are presented for example purposes only; however, such information may enable the particular user to make an informed decision as to whether or not it is preferred to delete particular content as currently stored to the DVR to make room for the particular instance of programming. Accordingly, following step 118, process flow within the method 100 may proceed to step 120.

At step 120, the television receiver may detect (or not) selection of one or more particular instances of content currently stored to the DVR for deletion, to "make room" for the particular instance of programming so that the same may be recorded thereto. Accordingly, when, for example, the television receiver determines that a selection has not been made of any particular instances of content currently stored to the DVR for deletion, process flow within the method 100 may proceed to termination step 122. Here, it will be appreciated that step 122 is accessed when it is found by the television receiver that either an alternative source is currently or instantly unavailable (step 104) or, that the particular user does not want to make space to record the particular instance of programming at an actual time of broadcast of the same (step 120). When, however, the television receiver determines that a selection has been made of one or more particular instances of content currently stored to the DVR for deletion, process flow within the method 100 may proceed to step 124. At step 124, the television receiver may access or otherwise transfer a command to the DVR to delete the identified one or more particular instances of content currently stored to the DVR. Then, at step 116, the television receiver itself may receive and transfer, for persistent storage therein the particular instance of programming to the DVR, at the actual time of broadcast of the same in manner similar to that as discussed above. Further scenarios and beneficial aspects associated with surfacing or providing to a television viewer via an EPG interface one or more alternative options for accessing particular content of interest, that which is initially itemized or presented for selection in the EPG interface, as shown and described in connection with FIG. 1 are described in detail below in connection with FIGS. 2-8.

Figure 2:
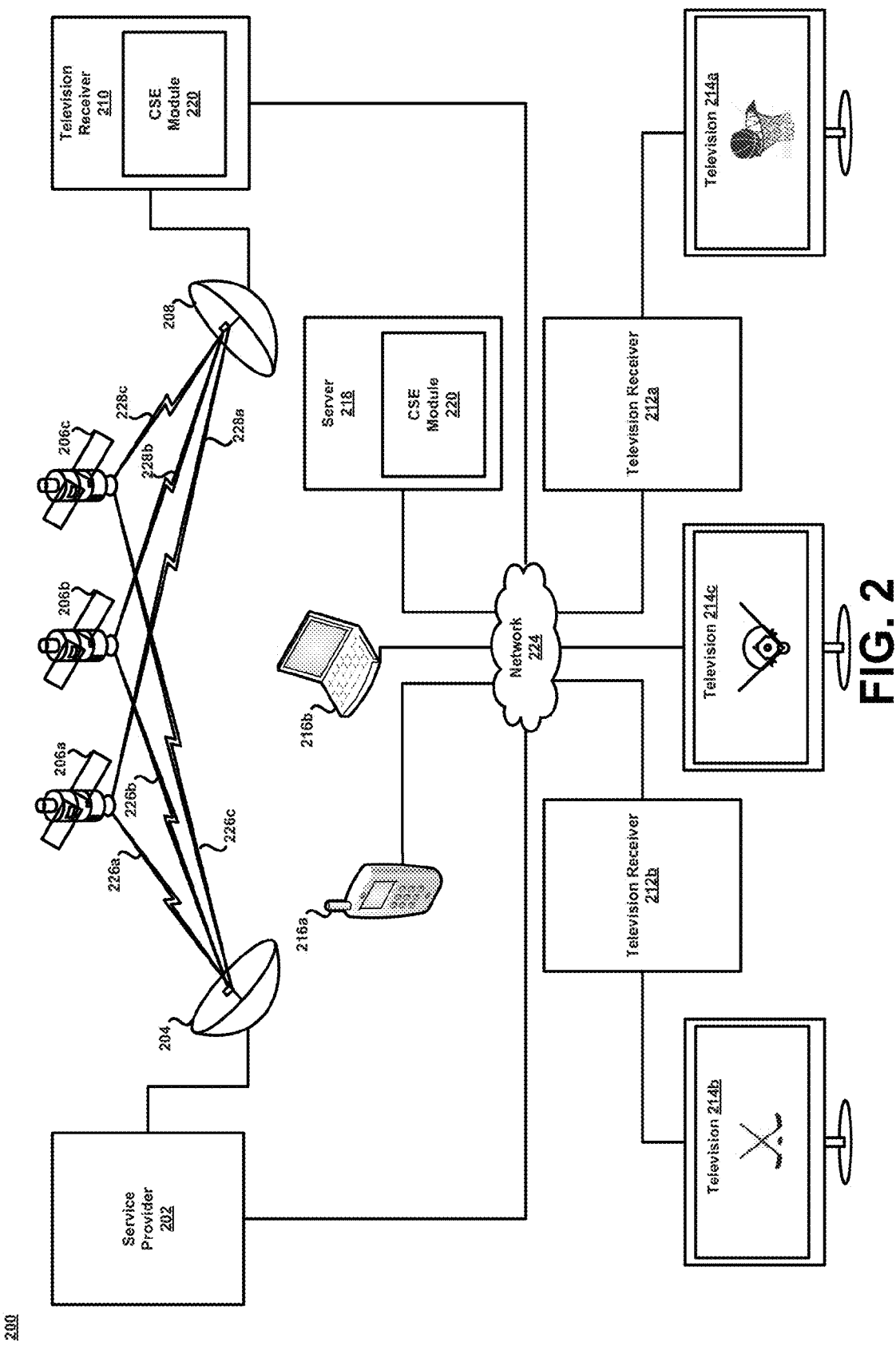
FIG. 2 shows an example content distribution system according to the disclosure.

Referring now to FIG. 2, an example satellite television distribution system 200 is shown. For brevity, the system 200 is depicted in a simplified form, and may include more or fewer systems, devices, networks, and/or other components as desired. Further, number and type of features or elements incorporated within the system 200 may or may not be implementation-specific, and at least some of the aspects of the system 200 may be similar to a cable television distribution system, an IPTV (Internet Protocol Television) content distribution system, and/or any other type of media content distribution system as desired.

The example system 200 may include a service provider 202, a satellite uplink 204, a plurality of satellites 206a-c, a satellite dish 208, a PTR (Primary Television Receiver) 210, a plurality of STRs (Secondary Television Receivers) 212a-b, a plurality of televisions 214a-c, a plurality of computing devices 216a-b, and at least one server 218. Here, it is contemplated that the at least one server 218 may be associated with the service provider 102. Additionally, assuming that the at least one server 218 in fact comprises many servers, networked connected and not necessarily owned by a same entity, the at least one server 218 may be associated with a particular third party content provider. An example of such a provider may be one that provides on-demand Internet streaming media, or the like, such as an OTT (Over-The-Top) subscription service offering ad-supported on-demand streaming media, an online social networking service, and/or network-accessible resource that may serve media or media content. Example types of media or media content may include advertising media, broadcast media, social media, news media, and so on. Additionally, the PTR 210 and the server 218 may include a CSE (Content Sourcing Engine) module 220.

In general, the CSE module 220 may be configured and/or arranged to implement various features or aspects of the present disclose associated with for surfacing or providing to a television viewer via an EPG interface one or more alternative options for accessing particular content of interest, that which is initially itemized or presented for selection in the EPG interface. Such an implementation may be beneficial and/or advantageous in many respects. For example, and as discussed in further detail below, an advantage of sponsored links to online content is that this may increase revenue of an end provider, even when used as a content carrier, rather than a content provider. This may provide a viable reason to carry as well as provide content.

The system 200 may further include at least one network 224 that establishes a bidirectional communication path for data transfer between and among each respective element of the system 200, outside or separate from the unidirectional satellite signaling path. The network 224 is intended to represent any number of terrestrial and/or non-terrestrial network features or elements. For example, the network 224 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the system 200.

The PTR 210, and the STRs 212a-b, as described throughout may generally be any type of television receiver, television converter, etc., such as a STB for example. In another example, the PTR 210, and the STRs 212a-b, may exhibit functionality integrated as part of or into a television, a DVR, a computer such as a tablet computing device, or any other computing system or device, as well as variations thereof. Further, the PTR 210 and the network 224, together with the STRs 212a-b and televisions 214a-c, and possibly the computing devices 216a-b, may each be incorporated within or form at least a portion of a particular home computing network. Further, the PTR 210 may be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other examples are possible. For example, one or more of the various elements or components of the example system 200 may be configured to communicate in accordance with the MoCA® (Multimedia over Coax Alliance) home entertainment networking standard. Still other examples are possible.

In practice, the satellites 206a-c may each be configured to receive uplink signals 226a-c from the satellite uplink 204. In this example, each the uplink signals 226a-c may contain one or more transponder streams of particular data or content, such as one or more particular television channels, as supplied by the service provider 202. For example, each of the respective uplink signals 226a-c may contain various media or media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 206a-c.

Further, different media content may be carried using different transponders of a particular satellite (e.g., satellite 206a); thus, such media content may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206a, and etc. Each of these television channels may be scrambled such that unauthorized persons are prevented from accessing the television channels.

The satellites 206a-c may further be configured to relay the uplink signals 226a-c to the satellite dish 208 as downlink signals 228a-c. Similar to the uplink signals 226a-c, each of the downlink signals 228a-c may contain one or more transponder streams of particular data or content, such as various encoded and/or at least partially electronically scrambled television channels, on-demand programming, etc., in accordance with an allotted carrier frequency and bandwidth. The downlink signals 228a-c, however, may not necessarily contain the same or similar content as a corresponding one of the uplink signals 226a-c. For example, the uplink signal 226a may include a first transponder stream containing at least a first group or grouping of television channels, and the downlink signal 228a may include a second transponder stream containing at least a second, different group or grouping of television channels. In other examples, the first and second group of television channels may have one or more television channels in common. In sum, there may be varying degrees of correlation between the uplink signals 226a-c and the downlink signals 228a-c, both in terms of content and underlying characteristics.

Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, ESPN®, and etc. Further, the term "channel," may in some contexts carry a different meaning from or than its normal plain language meaning. For example, the term "channel" may denote a particular carrier frequency or sub-band which can be tuned to by a particular tuner of a television receiver. In other contexts though, the term "channel" may refer to a single program/content service such as HBO®.

Additionally, a single satellite may typically have multiple transponders (e.g., transponders) each one broadcasting a channel or frequency band of about 24-27 MHz in a broader frequency or polarity band of about 500 MHz. Thus, a frequency band of about 500 MHz may contain numerous sub-bands or channels of about 24-27 MHz, and each channel in turn may carry a combined stream of digital data comprising a number of content services. For example, a particular hypothetical transponder may carry HBO®, CBS®, ESPN®, plus several other channels, while another particular hypothetical transponder may itself carry 3, 4, 5, 6, etc., different channels depending on the bandwidth of the particular transponder and the amount of that bandwidth occupied by any particular channel or service on that transponder stream. Further, in many instances a single satellite may broadcast two orthogonal polarity bands of about 500 MHz. For example, a first polarity band of about 500 MHz broadcast by a particular satellite may be left-hand circular polarized, and a second polarity band of about 500 MHz may be right-hand circular polarized. Other examples are possible.

Continuing with the example scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 228a-c, from one or more of the satellites 206a-c. Based on the characteristics of the PTR 210 and/or satellite dish 208, however, it may only be possible to capture transponder streams from a limited number of transponders concurrently. For example, a particular tuner of the PTR 210 may be configured to tune to a single transponder stream from a transponder of a single satellite at a time.

Additionally, the PTR 210, which is communicatively coupled to the satellite dish 208, may subsequently select via tuner, decode, and relay particular transponder streams to the television 214c for display thereon. For example, the satellite dish 208 and the PTR 210 may, respectively, be configured to receive, decode, and relay at least one premium HD-formatted television channel to the television 214c. Programming or content associated with the HD channel may generally be presented live, or from a recording as previously stored on, by, or at the PTR 210. Here, the HI) channel may be output to the television 214c in accordance with the HDMI/HDCP content protection technologies. Other examples are however possible.

Further, the PTR 210 may select via tuner, decode, and relay particular transponder streams to one or both of the STRs 212a-b, which may in turn relay particular transponder streams to a corresponding one of the televisions 214a-b for display thereon. For example, the satellite dish 208 and the PTR 210 may, respectively, be configured to receive, decode, and relay at least one television channel to the television 214a by way of the STR 212a. Similar to the above-example, the television channel may generally be presented live, or from a recording as previously stored on the PTR 210, and may be output to the television 214a by way of the STR 212a in accordance with a particular content protection technology and/or networking standard. Still further, the satellite dish 208 and the PTR 210 may, respectively, be configured to receive, decode, and relay at least one premium television channel to one or each of the computing devices 216a-b. Similar to the above-examples, the television channel may generally be presented live, or from a recording as previously stored on the PTR 210, and may be output to one or both of the computing devices 216a-b in accordance with a particular content protection technology and/or networking standard.

Figure 3:
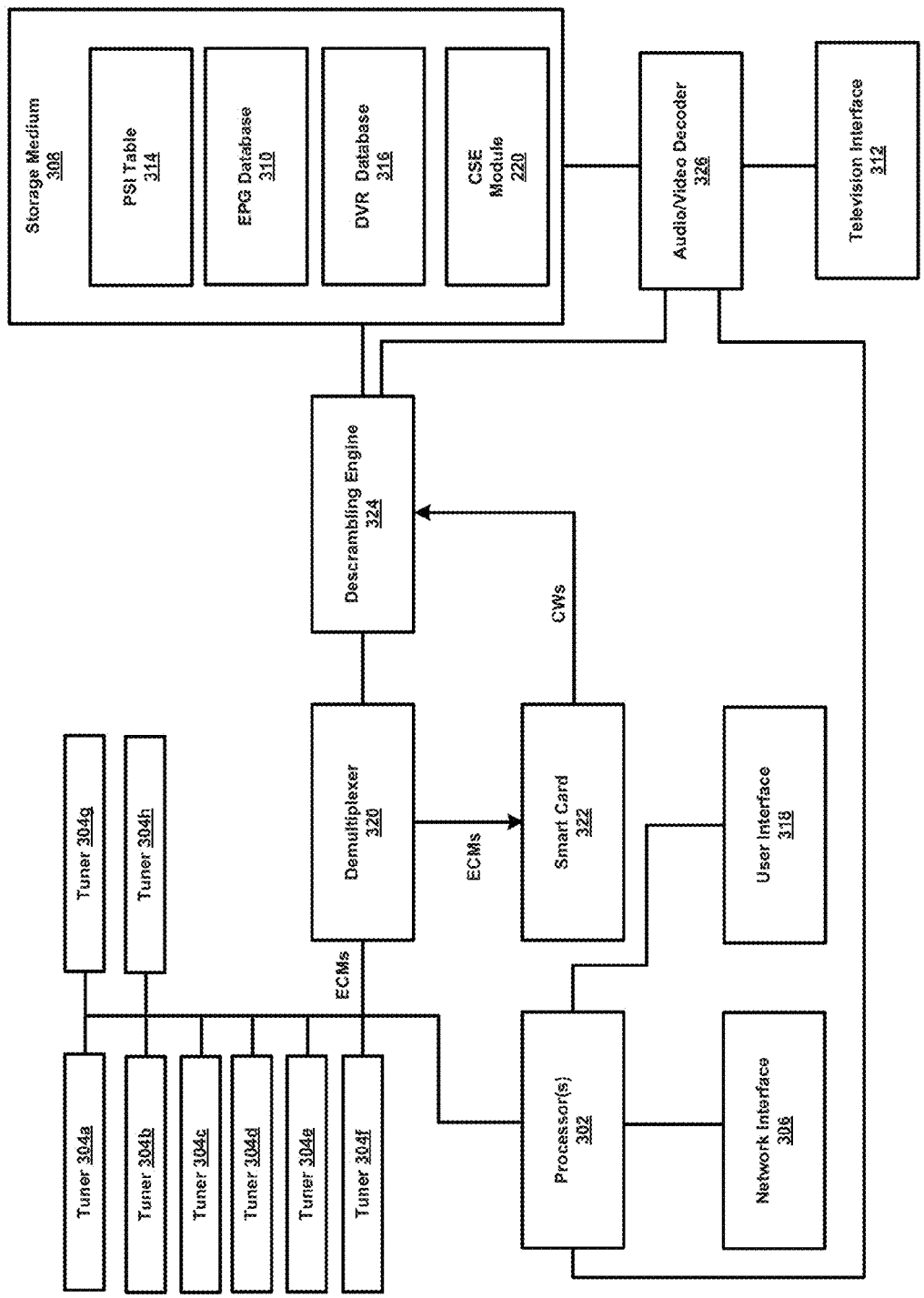
FIG. 3 shows an example block diagram of a television receiver.

Referring now to FIG. 3, an example block diagram of the PTR 210 of FIG. 2 is shown. In some examples, STRs 312a-b may be configured in a manner similar to that of the PTR 210. In some examples, the STRs 312a-b may be configured and arranged to exhibit a reduced functionality as compared to the PTR 210, and may depend at least to a certain degree on the PTR 210 to implement certain features or functionality. The STRs 312a-b in this example may be each referred to as a "thin client." The PTR 210 may include one or more processors 302, a plurality of tuners 304a-h, at least one network interface 306, at least one non-transitory computer-readable storage medium 308, at least one EPG (Electronic Programming Guide) database 310, at least one television interface 312, at least one PSI (Program Specific Information) table 314, at least one DVR database 316, at least one user interface 318, at least one demultiplexer 320, at least one smart card 322, at least one descrambling engine 324, at least one decoder 326. In other examples, fewer or greater numbers of components may be present. Further, functionality of one or more components may be combined; for example, functions of the descrambling engine 324 may be performed by the processors 302. Still further, functionality of components may be distributed among additional components, and possibly additional systems such as, tier example, in a cloud-computing implementation.

The processors 302 may include one or more specialized and/or general-purpose processors configured to perform processes such as tuning to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling.

The tuners 304a-h may be used to tune to television channels, such as television channels transmitted via satellites 306a-c. Each one of the tuners 304a-h may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 304a) may be used to tune to a television channel on a first transponder stream for display using a television, while another tuner (e.g., tuner 304b) may be used to tune to a television channel on a second transponder for recording and viewing at some other time. If multiple television channels transmitted on the same transponder stream are desired, a particular tuner (e.g., tuner 304c) may be used to receive the signal containing the multiple television channels for presentation and/or recording of each of the respective multiple television channels, such as in a PTAT (Primetime Anytime) implementation for example. Although eight tuners are shown, the PTR 210 may include more or fewer tuners (e.g., three tuners, sixteen tuners, etc.), and the features of the disclosure may be implemented similarly and scale according to the number of tuners of the PTR 210.

The network interface 306 may be used to communicate via alternate communication channel(s) with a service provider. For example, the primary communication channel between the service provider 202 of FIG. 2 and the PTR 210 may be via satellites 306a-c, which may be unidirectional to the PTR 210, and an another communication channel between the service provider 202 and the PTR 210, which may be bidirectional, may be via the network 224. In general, various types of information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the CSE module 220 mentioned above. Recorded television programs may be stored using the storage medium 308.

The EPG database 310 may store information related to television channels and the timing of programs appearing on such television channels. Information from the EPG database 310 may be used to inform users of what television channels or programs are available, popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellites 206a-c of FIG. 2. For example, updates to the EPG database 310 may be received periodically or at least intermittently via satellite. The EPG database 310 may serve as an interface for a user to control DVR functions of the PTR 210, and/or to enable viewing and/or recording of multiple television channels simultaneously.

The decoder 326 may convert encoded video and audio into a format suitable for output to a display device. For instance, the decoder 326 may receive MPEG video and audio from the storage medium 308, or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In the example, eight television channels may be decoded concurrently or simultaneously. The television interface 312 output a signal to a television, or another form of display device, in a proper format for display of video and play back of audio. As such, the television interface 312 may output one or more television channels, stored television programming from the storage medium 308, such as television programs from the DVR database 316 and/or information from the EPG database 310 for example, to a television for presentation.

The PSI table 314 may store information used by the PTR 210 to access various television channels. Information used to populate the PSI table 314 may be received via, satellite, or cable, through the tuners 304a-h and/or may be received via the network interface 306 over the network 224 from the service provider 202 shown in FIG. 2, information present in the PSI table 314 may be periodically or at least intermittently updated, information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some examples, the PSI table 314 may be divided into a number of tables, such as a NIT (Network Information Table), a PAT (Program Association Table), and a PMT (Program Management Table).

Table 1 below provides a simplified example of the PSI table 314 for several television channels. It should be understood that in other examples, many more television channels may be represented in the PSI table 314. The PSI table 314 may be periodically or at least intermittently. As such, television channels may be reassigned to different satellites and/or transponders, and the PTR 210 may be able to handle this reassignment as long as the PSI table 314 is updated.

TABLE 1

| Channel | Satellite | Transponder | ECM PID | Audio PIDs | Video PID |
|---------|-----------|-------------|---------|------------|-----------|
| 4 | 1 | 2 | 27 | 2001 | 1011 |
| 5 | 2 | 11 | 29 | 2002 | 1012 |
| 7 | 2 | 3 | 31 | 2003 | 1013 |
| 13 | 2 | 4 | 33 | 2003, 2004 | 1013 |

It should be understood that the values provided in Table 1 are for example purposes only Actual values, including how satellites and transponders are identified, may vary. Additional information may also be stored in the PSI table 314. Video and/or audio for different television channels on different transponders may have the same PIDs. Such television channels may be differentiated based on which satellite and/or transponder to which a tuner is tuned.

DVR functionality of the PTR 210 may permit a television channel to be recorded for a period of time. The DVR database 316 may store timers that are used by the processors 302 to determine when a television channel should be tuned to and recorded to the DVR database 245 of storage medium 308. In some examples, a limited amount of space of the storage medium 308 may be devoted to the DVR database 316. Timers may be set by the service provider 202 and/or one or more users of the PTR 210. DVR functionality of the PTR 210 may be configured by a user to record particular television programs. The PSI table 314 may be used by the PTR 210 to determine the satellite, transponder, ECM PID, audio PID, and video PID. The user interface 318 may include a remote control, physically separate from PTR 210, and/or one or more buttons on the PTR 210 that allows a user to interact with the PTR 210. The user interface 318 may be used to select a television channel for viewing, view information from the EPG database 310, and/or program a tinier stored to the DVR database 316 wherein the timer may be used to control the DVR functionality of the PTR 210.

Referring back to the tuners 304a-h, television channels received via satellite may contain at least some encrypted or scrambles data. Packets of audio and video may be scrambled to prevent unauthorized users, such as nonsubscribers, from receiving television programming without paying the service provider 202. When one of the tuners 304a-h is receiving data from a particular transponder of a satellite, the transponder stream may be a series of data packets corresponding to multiple television channels. Each data packet may contain a PID, which in combination with the PSI table 314, can be determined to be associated with a particular television channel. Particular data packets, referred to as ECMs may be periodically transmitted. ECMs may be encrypted; the PTR 210 may use the smart card 322 to decrypt ECMs.

The smart card 322 may function as the CA (Controlled Access) which performs decryption of encryption data to obtain control words that are used to descramble video and/or audio of television channels. Decryption of an ECM may only be possible when the user (e.g., an individual who is associated with the PTR 210) has authorization to access the particular television channel associated with the ECM. When an ECM is received by the demultiplexer 320 and the ECM is determined to correspond to a television channel being stored and/or displayed, the ECM may be provided to the smart card 322 for decryption.

When the smart card 322 receives an encrypted ECM from the demultiplexer 320, the smart card 322 may decrypt the ECM to obtain some number of control words. In some examples, from each ECM received by the smart card 322, two control words are obtained. In some examples, when the smart card 322 receives an ECM, it compares the ECM to the previously received ECM. If the two ECMs match, the second ECM is not decrypted because the same control words would be obtained. In other examples, each ECM received by the smart card 322 is decrypted; however, if a second ECM matches a first ECM, the outputted control words will match; thus, effectively, the second ECM does not affect the control words output by the smart card 322. When an ECM is received by the smart card 322, it may take a period of time for the ECM to be decrypted to obtain the control words. As such, a period of time, such as about 0.2-0.5 seconds, may elapse before the control words indicated by the ECM can be obtained. The smart card 322 may be permanently part of the PTR 210 or may be configured to be inserted and removed from the PTR 210.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 320. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PID. In some examples, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304a-h may be scrambled. The video and/or audio may be descrambled by the descrambling engine 324 using a particular control word. Which control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage, such as part of the DVR database 316 for example, and/or to the decoder 326 for output to a television or other presentation equipment via the television interface 312.

For brevity, the PTR 210 is depicted in a simplified form, and may generally include more or fewer elements or components as desired, including those configured and/or arranged for implementing various features for surfacing or providing to a television viewer via an EPG interface one or more alternative options for accessing particular content of interest, that which is initially itemized or presented for selection in the EPG interface. For example, the PTR 210 is shown in FIG. 3 to include the CSE module 220 as mentioned above in connection with FIG. 2. While shown stored to the storage medium 308 as executable instructions, the CSE module 220 could, wholly or at least partially, be stored to the processor(s) 302 of the PTR 210. Further, some routing between the various modules of PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules.

Additionally, although not explicitly shown in FIG. 3, the PTR 210 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 210 may be configured to include any number of other various components or logical modules that are implemented in hardware, software, firmware, or any combination thereof, and such components or logical modules may or may not be implementation-specific.

Figure 4:
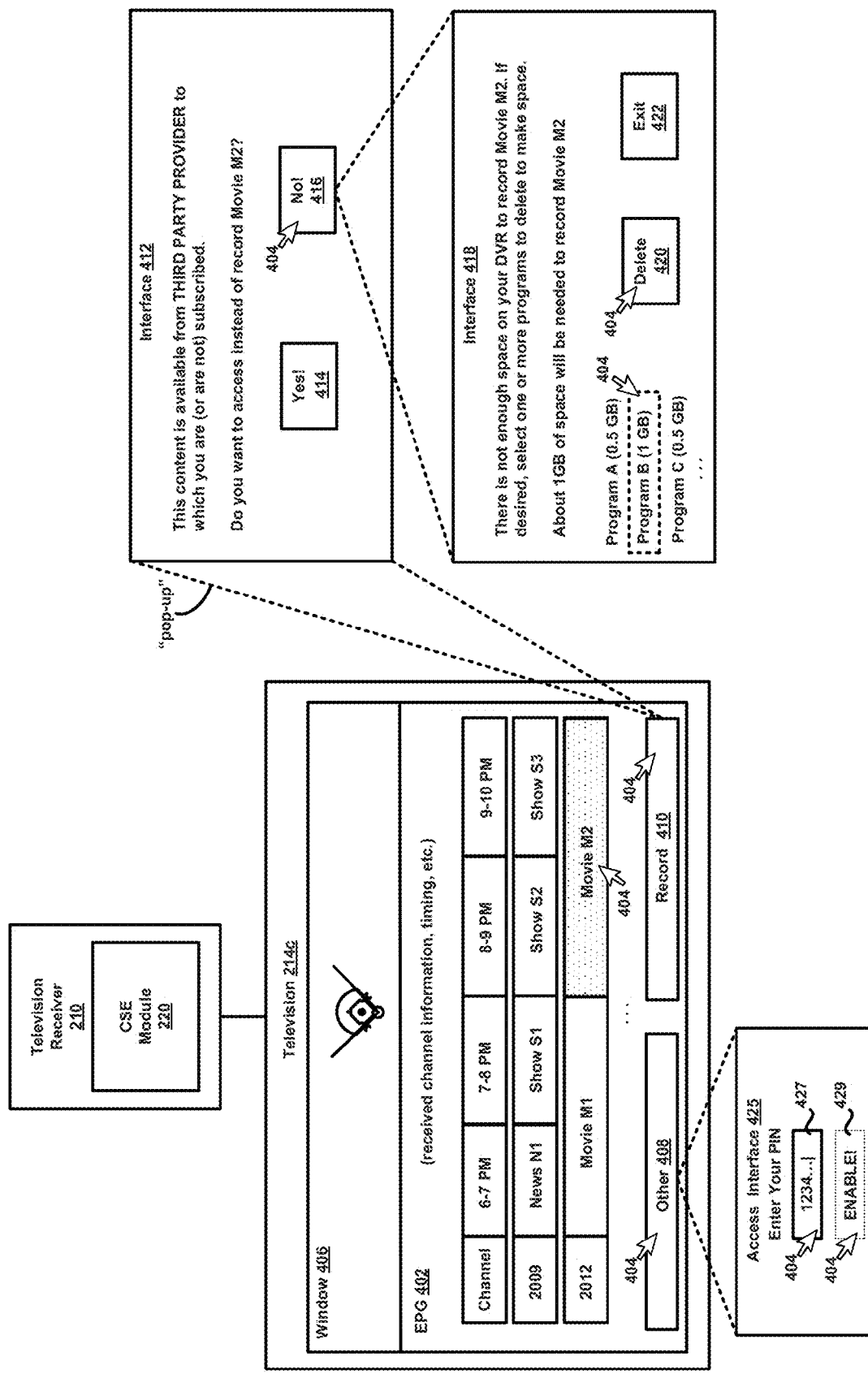
FIG. 4 shows first example aspects of the system of FIG. 2 in detail.

Referring now to FIG. 4, first example aspects of the system 200 of FIG. 2 are shown in detail. In particular, the PTR 210 may be configured to output an EPG (Electronic Programming Guide) 402 to and for presentation the television 214c, for example. The EPG 402 may at least present various information related to television channels and the timing of programs or programming appearing on such television channels. For example, as shown in FIG. 4, the EPG 402 may display information associated with a channel 2012, where the "Movie M2" is listed as scheduled to appear on that channel starting at a particular time on a particular day, and etc. In this example, and assuming that a current time is sometime during the time period 8-10 PM, a viewer may manipulate a cursor 404 using a pointing device (not shown) to select the Movie M2 for immediate viewing within a window 406 on the television 114c. Other examples are possible. For example, it is contemplated that any menu-driven navigation technique or implementation may be used to enable user-interaction with the EPG 402, along with other elements or interfaces output by the PTR 210 to the television 214c.

In addition to the EPG 402, the PTR 210 may be configured to output various other interactive elements or interfaces. For example, the CSE module 220 may be configured to output a first selection 408 and a second selection 410 for display within the EPG 402. In practice, it is contemplated that the first selection 408 may be selected in order to enable the CSE module 220 to surface or provide to a television viewer via the EPG 402, or variations thereof, one or more alternative or alternate options for accessing particular content of interest, that which is initially itemized or presented for selection in the EPG 402. For example, a particular individual may manipulate the cursor 404 to select the first selection 408, via a "point and double-click" action using a remote control for example and, in response, the CSE module 220 of the PTR 210 may be configured to output an access interface 425 to and for presentation by the television 214c.

In one example, the access interface 425 may include a prompt "Enter Your PIN" along with a data field 427 and an enable selection 429. In this example, the particular individual may enter into the data field 414 an alphanumeric sequence or the like and then select an "Enter" control on a pointing device (not shown) for example to "activate" the enable selection 429 order to enable the CSE module 220 to surface or provide to a television viewer via the EPG 402, or variations thereof, one or more alternative or alternate options for accessing particular content of interest, that which is initially itemized or presented for selection in the EPG 402. Assuming that the alphanumeric sequence is authenticated by the CSE module 220 associated with the PTR 210 following the described sequence, the enable selection 429 may become "active" so that the same may be selected using the cursor 404. In FIG. 4, the enable selection 429 is shown as "inactive," indicated by a perimeter line that is weighted less than that of the data field 427, or by a perimeter line that is lighter in terms of boldness than that of the data field 427. When the enable selection 429 becomes active the perimeter line of the same would be similar to that of the data field 427 as shown in FIG. 4.

Additionally, it is contemplated that a viewer may manipulate the cursor 404 using a pointing device to highlight, or place in-focus, etc., as shown by stipple shading in FIG. 4, the Movie M2 within the EPG 402, and then via manipulation of the cursor 404 select the second selection 410 with the intention to set a recording timer to record the Movie M2 at a time of broadcast of the same (i.e., 8 PM), for later or subsequent viewing. In response to the selection, a first interface 412 may be presented within the EPG 402, or at least partially superimposed thereover. As shown in FIG. 4, the first interface 412 may at least provide an indication to the viewer that the Movie M2 is available for access via one or more third party providers, to which the television viewer is or has subscribed, i.e., "This content is available from THIRD PARTY PROVIDER to which you are subscribed. Do you want to access instead of record Movie M2?" Here, it is contemplated that the viewer may optionally select a particular third party provider to access the particular instance of programming via confirm button 414, so as to avoid the step or need of recording that particular instance of programming to a DVR that is associated with the PTR 210 (e.g., DVR database 316), thus saving or otherwise conserving storage space of the DVR. Functionality associated with or provided by the CSE module 220 upon selection of the confirm button 414 is discussed below in connection with FIG. 5.

It is further contemplated that a decline button 416 may be optionally selected by the viewer to enable the viewer to decline or refuse access to the Movie M2 as provided by any particular third party provider. Functionality associated with or provided by the CSE module 220 upon selection of the decline button 416 is discussed here. For example, in this scenario, it might be assumed the viewer has the intention to record the Movie M2 to the DVR at an actual time of broadcast of the same. Although, this may not necessarily occur, as there is no requirement that the Movie M2 actually be recorded. Regardless; in response to the selection of the decline button 416, a second interface 418 may be presented within the EPG 402. As shown in FIG. 4, the second interface 418 may at least provide an indication to the viewer that a DVR associated with the PTR 210, e.g., via DVR database 316 as discussed above in connection with FIG. 3, does not currently or at an instant particular point in time have enough available storage space to per nit or allow a recording of Movie M2, i.e., "There is not enough space on your DVR to record Movie M2. If desired, select one or more programs to delete to make space. About 1 GB of space will be needed to record Movie M2."

As shown in FIG. 4, the second interface 418 may further provide output a list or listing of all content currently recorded to the DVR, e.g., "Program A (0.5 GB); Program B (1 GB); Program C (0.5 GB); . . . ." Here, it is contemplated that the viewer may optionally select or identify one or more of the programs of the list or listing for deletion, to make space to record the Movie M2 at the actual time of broadcast of the same. For example, the viewer may manipulate the cursor 404 using a pointing device to highlight, or place in-focus, etc., as shown by intermittent line in FIG. 4, the Program B within second interface 418, and then via manipulation of the cursor 404 select a delete selection 420 to perfect deletion of the Program B from the DVR to make space to record the Movie M2 at the actual time of broadcast of the same. Alternatively, the viewer may choose to leave the content as recorded to the DVR alone, or not mark any of the content currently stored to the DVR for deletion. For example, the viewer may via manipulation of the cursor 404 select an exit selection 422 to return to the interface of the EPG 402 itself as desired. Other examples of the first interface 412 and/or EPG 402 are possible as well, and the content of such in general may be controlled by the CSE module 220 of one or both of the PTR 210 and the server 218 as shown and described above.

Figure 5:
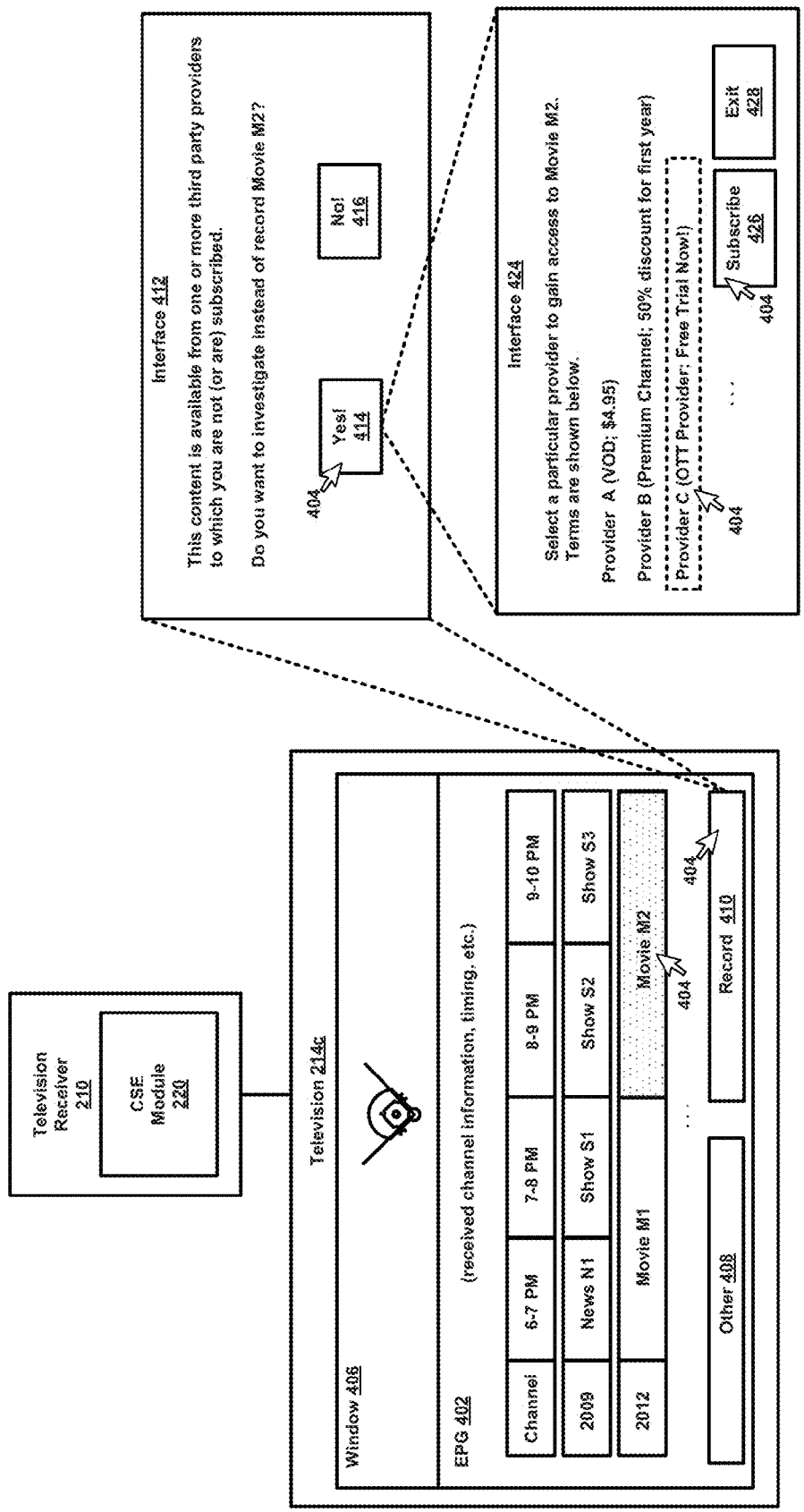
FIG. 5 shows second example aspects of the system of FIG. 2 in detail.

For example, referring now to FIG. 5, second aspects of the example system 200 of FIG. 2 are shown in detail, and may be considered similar to those aspects discussed above in connection with FIG. 4. For example, a variation of the first interface 412 introduced above is shown in FIG. 5, and it is contemplated that the first interface 412 itself may be accessed in manner similar to that discussed above. Further, it is contemplated that the viewer may optionally select a particular third party provider to access the Movie M2 via selection of the confirm button 414, so as to avoid the step or need of recording that particular instance of programming to the DVR, thus saving or otherwise conserving storage space of the DVR. For example, the viewer may initially manipulate the cursor 404 using a pointing device to highlight, or place in-focus, etc., as shown by stipple shading in FIG. 5, the Movie M2 within the EPG 402, and then via manipulation of the cursor 404 select the second selection 410 with the intention to set a recording timer to record the Movie M2 at a time of broadcast of the same (i.e., 8 PM), for later or subsequent viewing.

In response to the selection, the first interface 412 may be presented within the EPG 402, or at least partially superimposed thereover. As shown in FIG. 5, the first interface 412 may at least provide an indication to the viewer that the Movie M2 is available for access via one or more third party providers, to which the television viewer is not currently subscribed to, i.e., "This content is available from one or more third party providers to which you are not subscribed. Do you want to investigate instead of record Movie M2?" Here, it is contemplated that the viewer may optionally select the decline button 416 to instantiate one or more processes similar to that discussed above in connection with FIG. 4. Alternatively, the viewer may select the confirm button 414. Functionality associated with or provided by the CSE module 220 upon selection of the confirm button 414 is discussed here.

For example, in this scenario, it might be assumed the viewer has the intention to access the Movie M2 via other means, so as to avoid the step or need of recording the Movie M2 to the DVR associated with the PTR 210. Although, this may not necessarily occur, as there is no requirement that the Movie M2 actually be accessed from an alternative source. Regardless, in response to the selection of the confirm button 414, a third interface 424 may be presented within the EPG 402. As shown in FIG. 5, the third interface 424 may at least provide an indication to the viewer that at least one alternate source is available by or for which access to the Movie M2 may be perfected, along with basic terms for access to the Movie M2, i.e., "Select a particular provider to gain access to Movie M2. Terms are shown below." While the following description assumes that Movie M2 is available for access via one or more third party providers to which the television viewer is not currently subscribed, it may be that additionally, or alternatively, one or more options may be presented within the third interface 424 to indicate that Movie M2 is available for access via one or more third party providers to which the television viewer is currently subscribed. In other words, it is contemplated that the third interface 424 may provide or enable access to the Movie M2 from one or more third party providers to which the television viewer is and/is not currently subscribed.

For example, the third interface 424 may provide a list or listing of all providers that may serve as a source of the Movie M2, along with a basic description and terms that might need to be agreed to in order to enable access to the Movie M2 (or not if a subscription already exists), e.g., "Provider A (Video-On-Demand; $4.95); Provider B (Premium Channel; 50% discount for first year); Provider C (OTT Provider; Free Trial Now!); . . . ." Here, it is contemplated that the viewer may optionally select or identify one or more of the providers as shown within the third interface 424 to either agree to the terms as shown in order to gain access to the Movie M2, or to decline altogether. For example, the viewer may manipulate the cursor 404 using a pointing device to highlight, or place in-focus, etc., as shown by intermittent line in FIG. 5, the alphanumeric characters "Provider C . . . " within the third interface 424, and then via manipulation of the cursor 404 select a subscribe selection 426 to perfect initialization or agreement to a subscription to the services offered by the Provider C.

In one example, the alphanumeric characters "Provider C . . . " may comprise of a URL (Uniform Resource Locater) and a "point and click+CTRL" action of the same may direct the television receiver to access and display within the EPG 402 additional description about the Provider C, so as to more fully educate the viewer prior to making any sort of commitment. Regardless, in the present example, it is contemplated that any accounting, etc., required to set-up the subscription may be handled by respective parties as needed or desired, following selection of the subscribe selection 426. Alternatively, the viewer may choose to exit the third interface 424 altogether without committing to any particular third party provider. For example, the viewer may via manipulation of the cursor 404 to select an exit selection 428 to return to the interface of the EPG 402 itself as desired. Other examples of the first interface 412 and/or EPG 402 are possible as well, and the content of such in general may be controlled by the CSE module 220 of one or both of the PTR 210 and the server 218 as shown and described above.

Figure 6:
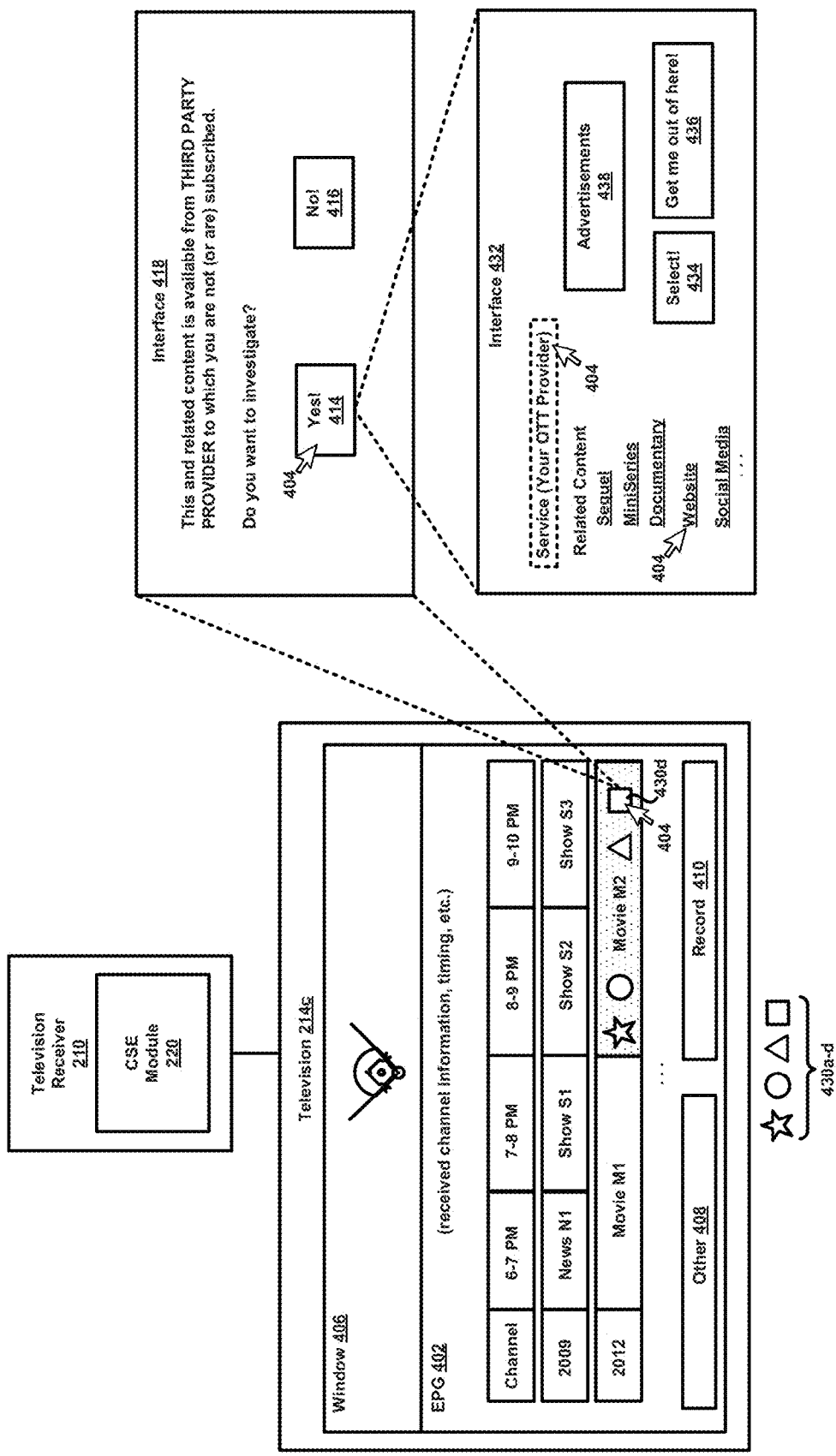
FIG. 6 shows third example aspects of the system of FIG. 2 in detail.

For example, referring now to FIG. 6, third example aspects of the system 200 of FIG. 2 are shown in detail, and may be considered similar those aspects discussed above in connection with FIGS. 4-5. For example, a variation of the first interface 412 introduced above is shown in FIG. 6, and it is contemplated that the first interface 412 itself may be accessed in manner similar to that discussed above. Further, it is contemplated that the viewer may optionally select a particular third party provider to access the Movie M2 via selection of the confirm button 414, so as to avoid the step or need of recording that particular instance of programming to the DVR, thus saving or otherwise conserving storage space of the MR.

For example, the viewer may initially manipulate the cursor 404 using a pointing device to highlight, or place in-focus, etc., as shown by stipple shading in FIG. 5, the Movie M2 within the EPG 402. In this example, though, it is contemplated that one or more selectable icons 430a-d may be generated so as to appear within or near or adjacent a cell or control within the EPG 402 that is associated with the Movie M2. As shown in FIG. 6, each one of the one or more selectable buttons or icons 430a-d are distinguished from each other, for example by virtue of being displayed as a particular logo that is itself associated with a particular third party provider (e.g., Netflix®)). Here, it is contemplated that the viewer may select the particular button or icon 430d, for example as shown in FIG. 6, possibly with the intention to explore or investigate terms and/or services and/or programming options provided by the associated third party provider to which a subscription associated with the viewer, or an account of the viewer, may or may not exist. It is contemplated that such details in general may be handled via or the CSE module 220.

For example, as shown in FIG. 6, the viewer may via manipulation of the cursor 404 select the particular button or icon 430d with the intention to explore or investigate terms and/or services and/or programming options provided by the associated third party provider to which a subscription associated with the viewer, or an account of the viewer, may or may not exist. In response to the selection, the first interface 412 may be presented within the EPG 402, or at least partially superimposed thereover. As shown in FIG. 6, the first interface 412 may at least provide an indication to the viewer that the Movie M2 is available for access via the third party provider associated with the particular button or icon 430d, i.e., "This and related content is available from THIRD PARTY PROVIDER to which you are not subscribed. Do you want to investigate?" Here, it is contemplated that the viewer may optionally select the decline button 416 to instantiate one or more processes similar to that discussed above in connection with FIG. 4. Alternatively, the viewer may select the confirm button 414. Functionality associated with or provided by the CSE module 220 upon selection of the confirm button 414 is discussed here.

For example, in this scenario, it might be assumed the viewer has the intention to access the Movie M2 via other means, so as to avoid the step or need of recording the Movie M2 to the DVR associated with the PTR 210. Although, this may not necessarily occur, as there is no requirement that the Movie M2 actually be accessed from an alternative source. Regardless, in response to the selection of the confirm button 414, a fourth interface 432 may be presented within the EPG 402. As shown in FIG. 6, the fourth interface 432 may at least provide an indication to the viewer that the Movie M2 is available via "Service (Your OTT Provider)." Here, it is contemplated that the viewer may optionally select an accept button 434 within the fourth interface 432 in order to gain immediate access to the Movie M2. For example, the viewer may manipulate the cursor 404 using a pointing device to highlight, or place in-focus, etc., as shown by intermittent line in FIG. 6, the alphanumeric characters "Service (Your OTT Provider)" to gain immediate access to the Movie M2. Alternatively, the viewer may choose to exit the fourth interface 432 altogether without committing to any particular third party provider. For example, the viewer may via manipulation of the cursor 404 to select a close selection 436 to return to the interface of the EPG 402 itself as desired.

In addition to the above-mentioned content of the fourth interface 432, it is contemplated that fourth interface 432 may be populated with a variety other content as well, by the CSE module 220 of one or both of the PTR 210 and the server 218 as shown and described above. For example, the fourth interface 432 may display a plurality of information corresponding to content that is "related" to the Movie M2. Here, in response to selection of the particular button or icon 430d as discussed in the above scenario, the CSE module 220 may output within the fourth interface 432 any of a plurality of various information that may be considered related to the Movie M2. For example, the fourth interface 432 may display a "Sequel" hyperlink, a "MiniSeries" hyperlink, a "Documentary" hyperlink, a "Website" hyperlink, a "Social Media" hyperlink, and etc.

In this example, when the "Sequel" hyperlink is selected a browser window or the like may open up and be displayed within the window 406 so that a viewer may navigate or explore a website associated with a sequel to the Movie M2. When the "MiniSeries" hyperlink is selected a browser window or the like may open up and be displayed within the window 406 so that a viewer may navigate a website associated with a miniseries that includes a lead actor or actress of the Movie M2. When the "Documentary" hyperlink is selected a browser window or the like may open up and be displayed within the window 406 so that a viewer may navigate a website associated with a documentary directed or produced, etc., by a director of the Movie M2. When the "Website" hyperlink is selected a browser window or the like may open up and be displayed within the window 406 so that a viewer may navigate a website generally corresponding to an online database of information related to films, television programs, etc. When the "Social Media" hyperlink is selected a browser window or the like may open up and be displayed within the window 406 so that a viewer may navigate a social media website possibly to read and provide commentary about the Movie M2.

It will be appreciated that the "hyperlinks" as shown in FIG. 6 are just examples. Many other "hyperlinks" or other information may be provided within the fourth interface 432 as well, and such information may be derived based on various content or characteristic associated with the Movie M2, since that movie may or might be considered of-interest by virtue of initial selection within the EPG 402, and/or based upon other criterion as well. For example, in addition to the plurality of various information displayed within the fourth interface 432 that might be considered "related content," it is contemplated that the fourth interface 432 may display one or more targeted advertisements, such as an advertisement 438 as shown in FIG. 6. In this example, it is contemplated that the advertisement 438 may for example include a service or package offered by the service provider 102 as part of a campaign to sell that service or package. That service or package may include certain content at least tangentially related to the Movie M2 based on a deduction that any particular subscriber or customer who takes the time to access the fourth interface 432 in light of exploring options related to the Movie M2 is very likely to be interested in that type of or related media or media content. Other examples are possible as well.

For example, the advertisement 438 may present an option to buy a soundtrack associated with the Movie M2. In this example, the service provider 102 may charge a fee and thus derive revenue from a particular third party in return for presenting such an advertisement. Other examples are possible. For example, the advertisement 438 may present an option to buy a ticket to a particular movie that may be considered similar to the Movie M2. Again; the service provider 102 may charge a fee and thus derive revenue from a particular third party in return for presenting such an advertisement. Still other mechanisms are contemplated in which the service provider 102 may derive revenue in light of the features and/or aspects of the present disclosure, as enabled by the CSE module 220 of one or both of the PTR 210 and the server(s) 208 as shown in FIG. 1.

Figure 7:
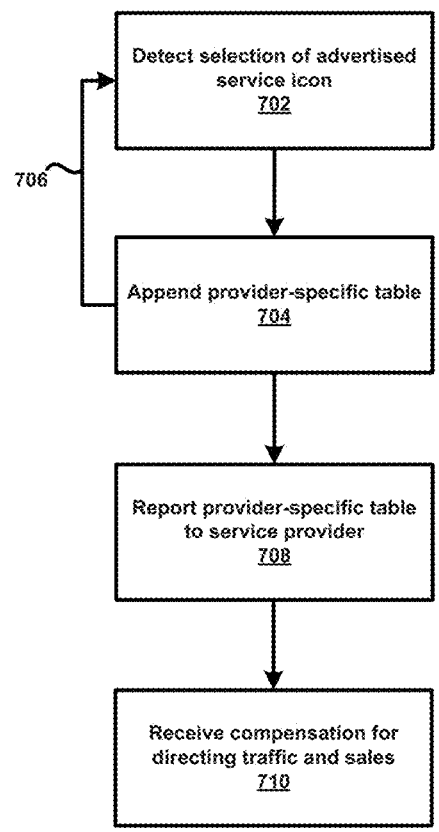
FIG. 7 shows a second example method according to the disclosure.

For instance, referring now to FIG. 7, a second example method 700 is shown according to the disclosure. In general, the method 700 may be used to demonstrate yet another mechanism by which the service provider 202 of FIG. 2 may derive revenue in light of the features and/or aspects of the present disclosure, as enabled by the CSE module 220 of one or both of the PTR 210 and the server 208, the server 208 in this instance being associated with the service provider 102. For example, at step 702, the CSE module 220 may detect selection of the icon 430d as shown and described above in connection with FIG. 6. Next, at step 704, the CSE module 220 may append a table, or the like, as part of a "bookkeeping" task to at least keep track of a number of times the icon 430d as shown and described is "selected." As shown in FIG. 7, this monitoring of selection of each particular icon or control as displayed within the EPG 402 within or near or adjacent a particular cell, associated with any particular instance of a programming option, not necessarily only Movie M2, may be considered a continuous, on-going process. This is indicated in FIG. 7 by a loop branch 706.

Next, at step 708, the CSE module 220 may parse the table and then invoice each particular third party provider to which an entry within the table exists. It is contemplated that this invoicing might be perfected by sending the same to a particular server 218 that is associated with a particular third party provider. As mentioned above, it is contemplated that the at least one server 218 as shown in FIG. 2 may be associated with the service provider 102. Additionally, assuming that the at least one server 218 in fact comprises many servers, networked connected and not necessarily owned by a same entity, the at least one server 218 may be associated with a particular third party content provider. Next, at step 710, the CSE module 220 may receive, in one form or another, compensation for directing traffic to a particular third party content provider, i.e., by providing access to third party content providers via selection of icons 430a-d as shown in FIG. 6. Furthermore, it is contemplated that the CSE module 220 may receive, in one form or another, compensation for any sales that may be considered to have originated via selection of any of the icons 430a-d for example as shown in FIG. 6.

Figure 8:
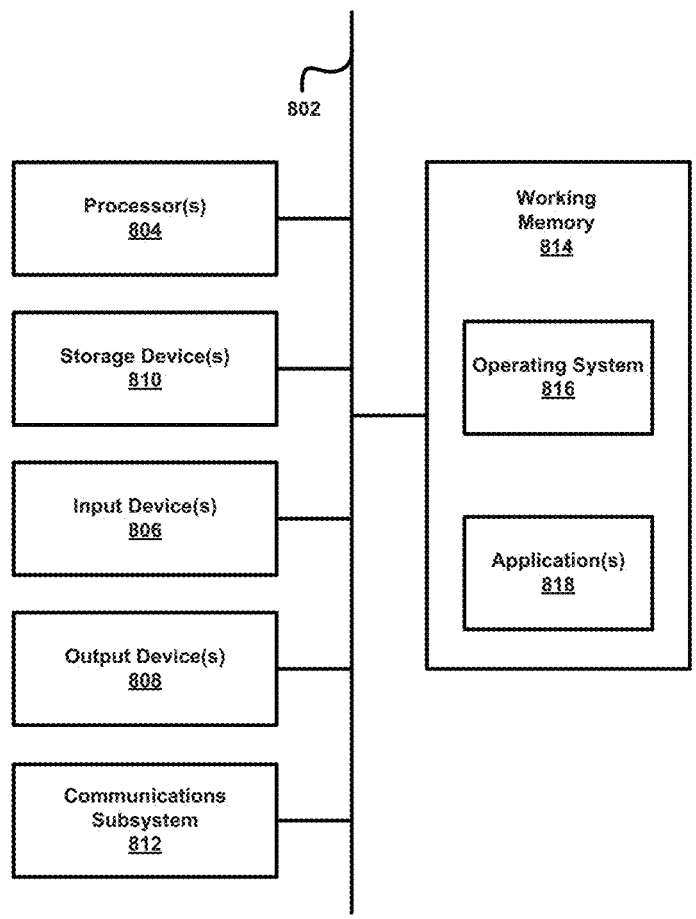
FIG. 8 shows an example computing system or device.

FIG. 8 shows an example computer system or device 800 in accordance with the disclosure. An example of a computer system or device includes an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 800, such as any of the respective elements of at least FIG. 2. In this manner, any of one or more of the respective elements of at least FIG. 2 may be configured and/or arranged, wholly or at least partially for surfacing or providing to a television viewer via an EPG interface one or more alternative options for accessing particular content of interest, that which is initially itemized or presented for selection in the EPG interface. For example, any of one or more of the respective elements of at least FIG. 2 may be configured and/or arranged to perform and/or include instructions that, when executed, perform the method of FIG. 1 and/or the method of FIG. 7. Still further, any of one or more of the respective elements of at least FIG. 2 may be configured to perform and/or include instructions that, when executed, instantiate and implement functionality of the PTR 210 and/or the server(s) 218.

The computer device 800 is shown comprising hardware elements that may be electrically coupled via a bus 802 (or may otherwise be in communication, as appropriate). The hardware elements may include a processing unit with one or more processors 804, including without limitation one or more general-purpose processors and/or one or more special-purpose processors (such as digital signal processing chips, graphics acceleration processors, and/or the like); one or more input devices 806, which may include without limitation a remote control, a mouse, a keyboard, and/or the like; and one or more output devices 808, which may include without limitation a presentation device (e.g., television), a printer, and/or the like.

The computer system 800 may further include (and/or be in communication with) one or more non-transitory storage devices 810, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 800 might also include a communications subsystem 812, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 812 may permit data to be exchanged with a network (such as the network described below, to name one example), other computer systems, and/or any other devices described herein. In many examples, the computer system 800 will further comprise a working memory 814, which may include a random access memory and/or a read-only memory device, as described above.

The computer device 800 also may comprise software elements, shown as being currently located within the working memory 814, including an operating system 816, device drivers, executable libraries, and/or other code, such as one or more application programs 818, which may comprise computer programs provided by various examples, and/or may be designed to implement methods, and/or configure systems, provided by other examples, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 810 described above. In some cases, the storage medium might be incorporated within a computer system, such as computer system 800. In other examples, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some examples may employ a computer system (such as the computer device 800) to perform methods in accordance with various examples of the disclosure. According to a set of examples, some or all of the procedures of such methods are performed by the computer system 800 in response to processor 804 executing one or more sequences of one or more instructions (which might be incorporated into the operating system 816 and/or other code, such as an application program 818) contained in the working memory 814. Such instructions may be read into the working memory 814 from another computer-readable medium, such as one or more of the storage device(s) 810. Merely by way of example, execution of the sequences of instructions contained in the working memory 814 may cause the processor(s) 804 to perform one or more procedures of the methods described herein.

The terms "machine-readable medium" and "computer-readable medium," as used herein, may refer to any non-transitory medium that participates in providing data that causes a machine to operate in a specific fashion. In an example implemented using the computer device 800, various computer-readable media might be involved in providing instructions/code to processor(s) 804 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 810. Volatile media may include, without limitation, dynamic memory, such as the working memory 814.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 804 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 812 (and/or components thereof) generally will receive signals, and the bus 802 then might carry the signals (and/or the data, instructions, etc. carried by the signals) to the working memory 814, from which the processor(s) 804 retrieves and executes the instructions. The instructions received by the working memory 814 may optionally be stored on a non-transitory storage device 810 either before or after execution by the processor(s) 804.

It should further be understood that the components of computer device 800 can be distributed across a network. For example, some processing may be performed in one location using a first processor while other processing may be performed by another processor remote from the first processor. Other components of computer system 800 may be similarly distributed. As such, computer device 800 may be interpreted as a distributed computing system that performs processing in multiple locations. In some instances, computer system 800 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   outputting, by a television receiver for display by a presentation device, an electronic programming guide for selection of programming from a television provider;
   detecting, by the television receiver, a command to define a timer to record particular programming at a time of broadcast of the particular programming by the television provider;
   outputting, within the electronic programming guide, an interactive interface that provides an activation indicator for activating access to subscription-based network-accessible programming sources different from the television provider;
   receiving input corresponding to selection of the activation indicator, thereby enabling access by the television receiver to subscription-based network-accessible programming sources different from the television provider;
   in response to enabling access by the television receiver to subscription-based network-accessible programming sources different from the television provider, querying local and non-local resources to identify a plurality of subscription-based options for access to the particular programming, wherein the plurality of subscription-based options identified includes a first option corresponding to a first network-accessible source for the particular programming, different from the television provider, for which an active subscription exists, and wherein the plurality of subscription-based options identified includes a second option corresponding to a second network-accessible source for the particular programming, different from the television provider, for which no active subscription exists;
   outputting, by the television receiver within the interactive interface within the electronic programming guide, the plurality of subscription-based options for access to the particular programming from network-accessible sources other than the television provider including the first option providing a first identifier of the first network-accessible source and the second option providing a second identifier of the second network-accessible source, wherein the second option identifies subscription terms for access to the particular programming from the second network-accessible source;
   receiving input corresponding to selection of the first option or the second option;
   receiving additional input corresponding to selection of a particular indicator to decline access to the particular programming from any source other than the television provider;

identifying an amount of storage space sufficient for storing the particular programming;

displaying, within the interactive interface, an indicator of the amount;

determining that unused storage space of a persistent storage medium is insufficient for storing the particular programming;

displaying, within the interactive interface, a list identifying recorded content and indicators of storage space freed upon deletion of the recorded content;

receiving further input corresponding to selection of a particular recorded content for deletion;

deleting the particular recorded content from the persistent storage medium, thereby increasing the unused storage space;

determining that unused storage space of the persistent storage medium is sufficient for storing the particular programming;

receiving the particular programming at the time of broadcast of the particular programming by the television provider;

storing the particular programming to the persistent storage medium at the time of broadcast of the particular programming by the television provider for subsequent access therefrom; and outputting the particular programming for display by the presentation device.

2. The method of claim 1, wherein the first identifier corresponds to a first logo or a first icon identifying the first network-accessible source and wherein the second identifier corresponds to a second logo or a second icon identifying the second network-accessible source.

3. The method of claim 1, further comprising:
receiving, via a network interface of the television receiver, the particular programming from the first network-accessible source without incurring additional fees.

4. The method of claim 1, further comprising:
perfecting initialization of or agreement to a subscription for the second network-accessible source; and
receiving, via a network interface of the television receiver, the particular programming from the second network-accessible source.

5. The method of claim 1, further comprising:
outputting, for display within the interactive interface, at least one advertisement for a service or package offered by the television provider based upon one or more particular attributes of the particular programming.

6. The method of claim 1, further comprising:
outputting, for display within the interactive interface, a source indicator that, when selected, activates the television receiver to access content from a third network-accessible source;
receiving input corresponding to selection of the source indicator, thereby enabling access to content from the third network-accessible source, wherein the plurality of subscription-based options is modified to include a third option corresponding to the third network-accessible source.

7. The method of claim 1, further comprising:
in response to receiving the input, logging the selection to update a number of particular instances of selection of each of the plurality of options; and
reporting a total number of particular instances of selection of the options for reimbursement from entities associated with each source.

8. The method of claim 1, further comprising:
displaying, within the interactive interface, a further indicator for disabling access to network-accessible sources of programming different from the television provider; and
receiving input corresponding to selection of the further indicator for disabling access to network-accessible sources of subscription-based programming different from the television provider, thereby deactivating access by the television receiver to network-accessible sources of subscription-based programming different from the television provider.

9. A television receiver, comprising:
at least one processor; and
at least one memory element communicatively coupled with and readable by at least one processor and having stored therein processor-readable instructions that, when executed by the at least one processor, cause the at least one processor to perform operations including:
outputting, to a presentation device using an output interface of the television receiver, an electronic programming guide for selection of programming from a television provider
detecting a command to define a timer to record particular programming at a time of broadcast of the particular programming by the television provider;
outputting, within the electronic programming guide, an interactive interface that provides an activation indicator for activating access to subscription-based network-accessible programming sources different from the television provider;
receiving input corresponding to selection of the activation indicator, thereby enabling access by the television receiver to subscription-based network-accessible programming sources different from the television provider;
in response to enabling access by the television receiver to subscription-based network-accessible programming sources different from the television provider, querying local and non-local resources to identify a plurality of subscription-based options for access to the particular programming, wherein the plurality of subscription-based options identified includes a first option corresponding to a first network-accessible source for the particular programming, different from the television provider, for which an active subscription exists, and wherein the plurality of subscription-based options identified includes a second option corresponding to a second network-accessible source for the particular programming, different from the television provider, for which no active subscription exists;
outputting, within the interactive interface within the electronic programming guide, the plurality of subscription-based options for access to the particular programming from network-accessible sources other than the television provider including the first option providing a first identifier of the first network-accessible source and a second option providing a second identifier of the second network-accessible source, and wherein the second option identifies subscription terms for access to the particular programming from the second network-accessible source;
receiving input corresponding to selection of the first option or the second option;

receiving additional input corresponding to selection of a particular indicator to decline access to the particular programming from any source other than the television provider;

identifying an amount of storage space sufficient for storing the particular programming;

displaying, within the interactive interface, an indicator of the amount;

determining that unused storage space of a persistent storage medium is insufficient for storing the particular programming;

displaying, within the interactive interface, a list identifying recorded content and indicators of storage space freed upon deletion of the recorded content for deletion;

deleting the particular recorded content from the persistent storage medium, thereby increasing the unused storage space;

determining that unused storage space of the persistent storage medium is sufficient for storing the particular programming;

receiving the particular programming at the time of broadcast of the particular programming by the television provider;

storing the particular programming to the persistent storage medium at the time of broadcast of the particular programming by the television provider for subsequent access therefrom; and outputting the particular programming to the presentation device using the output interface.

10. The television receiver of claim 9, wherein the first identifier corresponds to a first logo or a first icon identifying the first network-accessible source and wherein the second identifier corresponds to a second logo or a second icon identifying the second network-accessible source.

11. The television receiver of claim 9, wherein the operations further include:

receiving, via a network interface of the television receiver, the particular programming from the first network-accessible source without incurring additional fees.

12. The television receiver of claim 9, wherein the operations further include:

perfecting initialization of or agreement to a subscription for the second network-accessible source; and receiving, via a network interface of the television receiver, the particular programming from the second network-accessible source.

13. The television receiver of claim 9, wherein the operations further include:

outputting, to the presentation device for display within the interactive interface, at least one advertisement for a service or package offered by the television provide based upon one or more particular attributes of the particular programming.

14. The television receiver of claim 9, wherein the operations further include:

displaying, within the interactive interface, a further indicator for disabling access to network-accessible sources of programming different from the television provider; and receiving input corresponding to selection of the further indicator for disabling access to network-accessible sources of programming different from the television provider, thereby deactivating access by the television provider to network-accessible sources of programming different from the television provider.

15. A non-transitory computer readable medium comprising instructions that, when executed by one or more processors of a television receiver, cause the one or more processors to perform operations including:

outputting, to a presentation device using an output interface of the television receiver, an electronic programming guide for selection of programming from a television provider detecting a command to define a timer to record particular programming at a time of broadcast of the particular programming by the television provider;

outputting, within the electronic programming guide, an interactive interface that provides an activation indicator for activating access to subscription-based network-accessible programming sources different from the television provider;

receiving input corresponding to selection of the activation indicator, thereby enabling access by the television receiver to subscription-based network-accessible programming sources different from the television provider;

in response to enabling access by the television receiver to subscription-based network-accessible programming sources different from the television provider, querying local and non-local resources to identify a plurality of subscription-based options for access to the particular programming, wherein the plurality of subscription-based options identified includes a first option corresponding to a first network-accessible source for the particular programming, different from the television provider, for which an active subscription exists, and wherein the plurality of subscription-based options identified includes a second option corresponding to a second network-accessible source for the particular programming, different from the television provider, for which no active subscription exists;

outputting, to the presentation device using the output interface within the interactive interface within the electronic programming guide, the plurality of subscription-based options for access to the particular programming from network-accessible sources other than the television provider including the first option providing a first identifier of the first network-accessible source and the second option providing a second identifier of the second network-accessible source, wherein the second option identifies subscription terms for access to the particular programming from the second source;

receiving input corresponding to selection of the first option or the second option;

receiving additional input corresponding to selection of a particular indicator to decline access to the particular programming from any source other than the television provider;

identifying an amount of storage space sufficient for storing the particular programming;

displaying, within the interactive interface, an indicator of the amount;

determining that unused storage space of a persistent storage medium is insufficient for storing the particular programming;

displaying, within the interactive interface, a list identifying recorded content and indicators of storage space freed upon deletion of the recorded content;

receiving further input corresponding to selection of a particular recorded content for deletion;

deleting the particular recorded content from the persistent storage medium, thereby increasing the unused storage space;
determining that unused storage space of the persistent storage medium is sufficient for storing the particular programming;
receiving the particular programming at the time of broadcast of the particular programming by the television provider;
storing the particular programming to the persistent storage medium at the time of broadcast of the particular programming by the television provider for subsequent access therefrom; and
outputting the particular programming to the presentation device using the output interface.

16. The non-transitory computer readable medium of claim 15, wherein the first identifier corresponds to a first logo or a first icon identifying the first network-accessible source and wherein the second identifier corresponds to a second logo or a second icon identifying the second network-accessible source.

17. The non-transitory computer readable medium of claim 15, wherein the operations further include:
receiving, via a network interface of the television receiver, the particular programming from the first network-accessible source without incurring additional fees.

18. The non-transitory computer readable medium of claim 15, wherein the operations further include:
outputting, to the presentation device for display within the interactive interface, at least one advertisement for a service or package offered by the television provide based upon one or more particular attributes of the particular programming.

19. The non-transitory computer readable medium of claim 15, wherein the operations further include:
perfecting initialization of or agreement to a subscription for the second network-accessible source; and
receiving, via a network interface of the television receiver, the particular programming from the second network-accessible source.

* * * * *